United States Patent [19]
Lester et al.

[11] Patent Number: 5,353,307
[45] Date of Patent: Oct. 4, 1994

[54] AUTOMATIC SIMULCAST ALIGNMENT

[75] Inventors: Howard L. Lester, Alplaus, N.Y.; Sandeep Chennakeshu, Cary, N.C.

[73] Assignee: General Electric Company, Schenectady, N.Y.

[21] Appl. No.: 95,367

[22] Filed: Jul. 20, 1993

Related U.S. Application Data

[63] Continuation of Ser. No. 754,471, Sep. 3, 1991, abandoned.

[51] Int. Cl.$^5$ .................... H03H 7/30; H03H 7/40
[52] U.S. Cl. ................... 375/14; 375/94; 375/101; 455/51.2; 455/33.4; 364/724.2
[58] Field of Search ..................... 375/11–14, 375/94, 99–103; 455/51.1, 51.2, 303, 311, 312, 56.1, 33.3, 33.4, 52.1; 364/724.15, 724.16, 74.17, 724.19, 724.2

[56] References Cited

U.S. PATENT DOCUMENTS

| | | | |
|---|---|---|---|
| 3,879,664 | 4/1975 | Monsen | 375/14 |
| 4,328,585 | 5/1982 | Monsen | 375/14 |
| 4,718,109 | 1/1988 | Breeden et al. | 455/51.2 |
| 4,769,825 | 9/1988 | Vogel | 375/100 |
| 4,873,683 | 10/1989 | Borth et al. | 375/101 |
| 4,890,298 | 12/1989 | Galpin | 375/100 |
| 5,127,025 | 6/1992 | Okanoue | 375/100 |
| 5,127,101 | 6/1992 | Rose, Jr. | 455/67.1 |
| 5,142,551 | 8/1992 | Borth et al. | 375/103 |
| 5,155,859 | 10/1992 | Harris et al. | 455/51.2 |
| 5,203,027 | 4/1993 | Nounin et al. | 375/100 |
| 5,271,042 | 12/1993 | Borth et al. | 375/101 |

OTHER PUBLICATIONS

Narasimhan et al., "An Adaptive Lattice Decision Feedback Equalizer for Digital Cellular Radio", Proc. of the IEEE Vehicular Technology Conference, 1990.

Chennakeshu et al., "Decision Feedback Equalization for Digital Cellular Radio", Proc. of the IEEE International Communications Conference, Atlanta, Apr. 1990, pp. 1492–1496.

"New Adaptive Viterbi Detector for Fast-Fading Mobile-Radio Channels", Electronics Letters, Sep. 13, 1990, vol. 26, No. 19, pp. 1572 and 1573.

"Bit Synchronization and Timing Sensitivity in Adaptive Viterbi Equalizers for Narrowband TDMA Digital Mobile Radio Systems", IEEE Vehicular Technology Conference, Philadelphia, Pa., pp. 377–384.

"An Adaptive MLSE Receiver for TDMA Digital Mobile Radio", R. D'Avella et al., IEEE Journal on Selected Areas in Communications, vol. 7, No. 1, Jan. 1989, pp. 122–129.

(List continued on next page.)

Primary Examiner—Stephen Chin
Assistant Examiner—Don Vo
Attorney, Agent, or Firm—Marvin Snyder

[57] ABSTRACT

A digital simulcast transmission is automatically aligned, at a simulcast receiver (22) that simultaneously receives a plurality of RF signals from a plurality of transmitters, each of the RF signals being modulated to convey identical digitally encoded information. An equalizer (24) adaptively equalizes the plurality of received RF signals to substantially correct for a misalignment in time between the received signals. The misalignment in time is due in part to a non-simultaneous transmission of the identical digitally encoded information from the plurality of transmitters. Equalizer embodiments include a Decision Feedback Equalizer (DFE) and an equalizer based on a Maximum Likelihood Sequence Estimator (MLSE). Embodiments of the DFE are an Order Recursive Lattice-DFE and a Fast Kalman DFE.

36 Claims, 9 Drawing Sheets

OTHER PUBLICATIONS

"Design and Performance of Synchronization Techniques and Viterbi Adaptive Equalizers for Narrowband TDMA Mobile Radio", D'Aria et al., Proc. 3rd Nordic Seminar on Digital Land Mobile Radio Comm., Copenhagen, Denmark, Sep. 13-15, 1988.

"Application of Fast Kalman Estimation to Adaptive Equalization", D. Falconer, et al., IEEE Transactions on Communications, vol. COM-26, No. 10, Oct. 1978, pp. 1439-1446.

"Adaptive Maximum-Likelihood Receiver for Carrier-Modulated Data-Transmission Systems", G. Ungerboeck, IEEE Transactions on Communications, May 1974, pp. 624-636.

"A Generalized Multichannel Least Squares Lattice Algorithm Based on Sequential Processing Stages", F. Ling et al., IEEE Transactions on Acoustics, Speech, and Signal Processing, vol. ASSP-32, No. 2, Apr. 1984, pp. 381-389.

"Adaptive Lattice Decision-Feedback Equalizers—Their Performance and Application to Time-Variant Multipath Channels", F. Ling et al., IEEE Transactions on Communications, vol. COMM-33, No. 4, Apr. 1985, pp. 348-356.

"Multitransmitter Digital Signal Transmission by Using Offset Frequency Strategy in a Land-Mobile Telephone System", T. Hattori et al., IEEE Transactions on Vehicular Technology, vol. VT-27, No. 4, Nov. 1978, pp. 231-238.

"Delay Detection Method using Cross-Spectrum for Multitransmitter Simulcasting", Electronics Letters, May 11th, 1989, vol. 25, No. 10, pp. 652 and 653.

AUTOMATIC SIMULCAST ALIGNMENT

This application is a continuation of application Ser. No. 07/754,471 filed Sep. 3, 1991 which is now abandoned.

RELATED APPLICATIONS

This application is related to the following U.S. patent applications which are filed concurrently herewith and assigned to the present assignee:

S. Chennakeshu et al. Ser. No. 07/754,105, "Decision Feedback Equalization for Digital Cellular Radio";

S. Chennakeshu et al. Ser. No. 07/753,578, "Adaptive MLSE-VA Receiver for Digital Cellular Radio";

S. Chennakeshu et al. Ser. No. 07/754,579, "Order Recursive Lattice Decision Feedback Equalization for Digital Cellular Radio"; and R. Toy et al. Ser. No. 07/754,108, "Frame/Slot Synchronization for U.S. Digital Cellular TDMA Radio Telephone System".

FIELD OF THE INVENTION

This invention relates generally to telecommunication method and apparatus and, in particular, to method and apparatus for achieving automatic simulcast alignment in a digital simulcast system.

BACKGROUND OF THE INVENTION

As is well known, a simulcast system employs a plurality of base station RF transmitters to transmit an identical message to a mobile receiver. The transmitter geometry is typically a rectangular zone configuration, although triangular, hexagonal, and polygon "tile" configurations are also well known.

A receiver that is positioned within an overlap region between two transmitters simultaneously receives two signals that differ in arrival time and phase due to differences between when the signals are transmitted, multipath delays experienced by the transmitted signals, and other factors. However, in order to obtain an optimum received signal it is desirable that these identical simultaneous transmissions arrive at the receiver aligned in both time and phase.

For example, if, in a digital simulcast system operating at 9.6 Kbps, the transmissions are misaligned by more than 36 microseconds, the resulting mutual interference may cause erroneous reception of the data. As a result, present-day simulcast systems require the transmitted signals to be aligned in amplitude and phase so that the difference is less than 0.5% across the audio band, on a per channel basis. In order to maintain alignment between the plurality of transmitters, a time consuming calibration process must be performed at the individual base stations. One calibration method used to align the multiple transmissions requires 30 different multi-turn trimpot adjustments per channel/base station site. This calibration method requires precise adjustment of the trimpots and is extremely time consuming. Furthermore, periodic calibration must be performed in order to account for system drifts.

Other techniques for attempting to reduce the effect of misalignment between simulcast transmitters are known in the prior art. For example, in an article entitled "Multitransmitter Digital Signal Transmission by Using Offset Frequency Strategy in a Land-Mobile Telephone System" IEEE Transactions on Vehicular Technology, Vol. VT-27, No.4, November 1978, T. Hattori and K. Hirade describe a high capacity land-mobile telephone system in which voice channels are provided separately from control channels. A multiple control zone system that employs an offset carrier frequency technique is shown to be a preferred method for minimizing signal degradation . In an article entitled "Delay Spectrum Method Using Cross-Spectrum For Multitransmitter Simulcasting", Electronic Letters, May 11, 1989, Vol. 26, No. 10, J. Oka, T. Hattori and S. Ogose propose a solution based upon a delay difference detection method using cross-spectrum phase. In this scheme the multitransmitter simulcasting system employs a detector to detect delay differences between transmitted signals and a means for appropriately adjusting the phase of the input signals to transmitter transmission lines to minimize the detected delay differences. Delay differences between two signals are detected as the phase angle of the cross-spectrum of the two signals. The authors state that estimation of the delay is improved by employing a pseudorandom noise (PN) signal as a test signal in conjunction with a Minimum Square Error Estimation technique. The Hattori et al. and Oka et al. articles are hereby incorporated by reference.

These techniques, however, do not provide for improving signal quality automatically within the mobile receiver itself.

It is thus an object of the invention to provide method and apparatus for achieving automatic simulcast alignment in a digital simulcast system within the mobile receiver itself.

It is a further object of the invention to provide method and apparatus for achieving automatic simulcast alignment in a digital simulcast system by considering the multiplicity of received signals as a multipath delay problem and employing an adaptive recursive equalizer to correct the misalignment in time and to correct for phase and amplitude differences.

It is a further object of the invention to provide method and apparatus for achieving automatic simulcast alignment in a digital simulcast system by employing an adaptive equalizer to correct the misalignment in time and to correct for phase and amplitude differences while also beneficially providing diversity gain by combining energy from each received signal.

SUMMARY OF THE INVENTION

The foregoing problems are overcome and the objects of the invention are realized by method and apparatus for automatically aligning, at the receiver, a digital simulcast transmission. The apparatus includes a receiver for simultaneously receiving a plurality of RF signals from a plurality of transmitters, each of the RF signals being modulated to convey identical digitally encoded information. The receiver includes an equalizer for adaptively correcting the plurality of received signals for a misalignment in arrival times, wherein the misalignment in arrival time is due in part to non-simultaneous transmission of the identical, digitally encoded information from the plurality of transmitters.

Further in accordance with the invention several presently preferred equalizer embodiments are described, including a Decision Feedback Equalizer (DFE) and an equalizer based on a Maximum Likelihood Sequence Estimator (MLSE). The MLSE method employs a modified form of the Viterbi algorithm and is denominated MLSE-VA. Presently preferred embodiments of the DFE are a Lattice-DFE and a Fast Kalman DFE.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

FIG. 10b is a block diagram illustrating a two channel stage of the Order Recursive Lattice DFE embodiment of the invention;

FIG. 10c is a block diagram illustrating a single channel stage of the Order Recursive Lattice DFE embodiment of the invention.

DETAILED DESCRIPTION OF A PREFERRED EMBODIMENT OF THE INVENTION

In a multipath mobile radio environment, such as in a digital cellular radio system, a transmitted signal arrives at a receiver along different paths. The received signals are misaligned in time, and have random amplitudes and phases. This time dispersion of the signal causes intersymbol interference (ISI). In such a system it is known to employ an equalizer to correct for multipath delays.

In recognition of the above, this invention advantageously considers a simulcast transmission as a multipath problem wherein each transmission gives rise to one of the paths of transmission, and wherein an equalizer is employed within a receiver to compensate for resulting signal degradation. Furthermore, since the transmission conditions vary with time the equalizer is preferably implemented as an adaptive equalizer to rapidly correct for misalignments in time and to correct for signal phase and amplitude differences.

Figure 1:
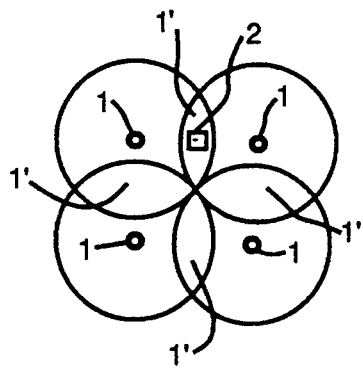
FIG. 1 depicts a plurality of RF transmitters and a receiver in a simulcast system.

FIG. 1 schematically illustrates a simulcast system having a plurality of base station RF transmitters 1 that transmit an identical message to a mobile receiver 2. The transmitter geometry illustrated in FIG. 1 is a rectangular zone configuration, although triangular, hexagonal, and polygon "tile" configurations are also well known.

If receiver 2 is positioned within an overlap region 1' between two transmitters, the receiver simultaneously receives two signals that differ in arrival time and phase due to differences between when the signals are transmitted, multipath delays experienced by the transmitted signals, and other factors. In order to achieve an optimum received signal, however, it is desirable that these identical simultaneous transmissions arrive at receiver 2 aligned in both time and phase.

Figure 2:
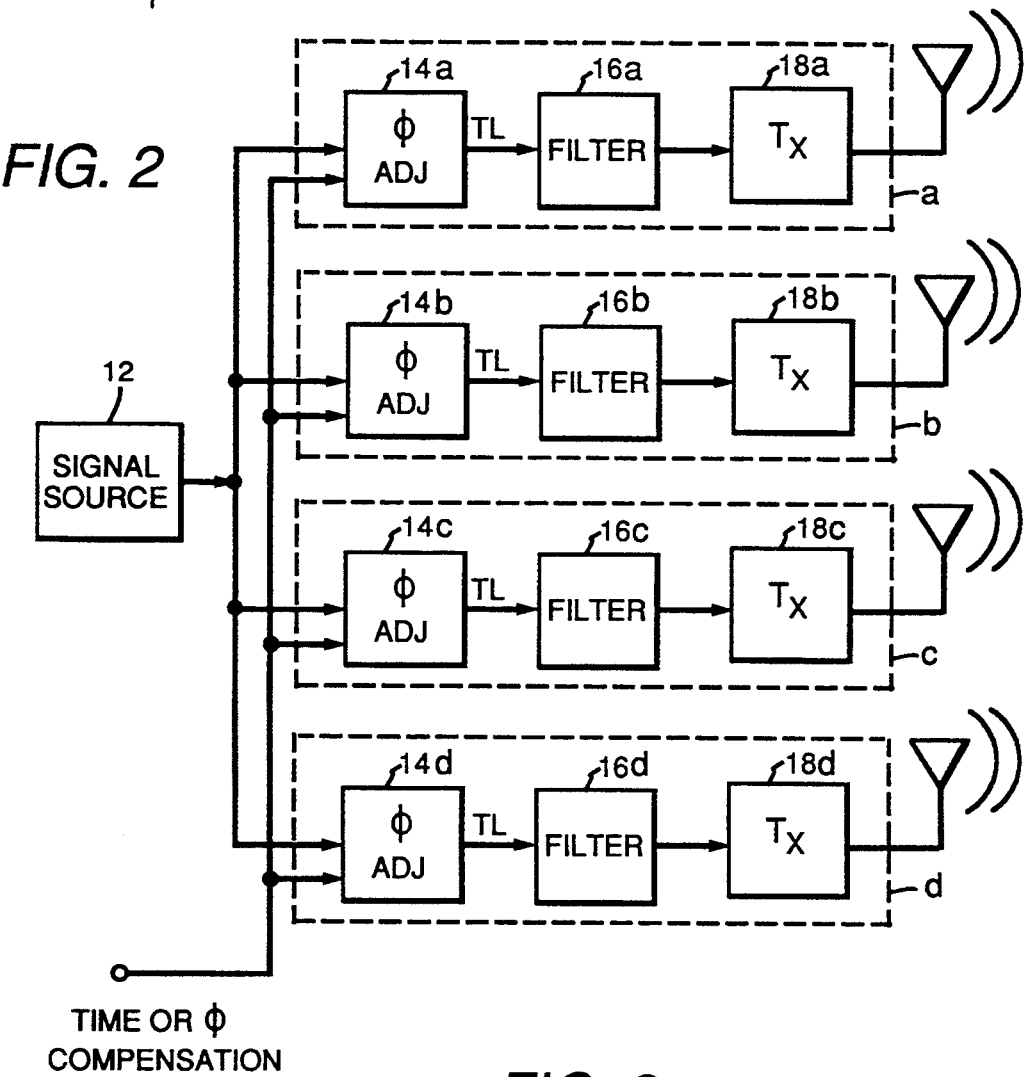
FIG. 2 is a simplified block diagram of the simulcast transmitters of FIG. 1.

Referring to FIG. 2 a signal source 12 provides a signal to a plurality of transmitter channels. Although four transmitter channels are shown in FIGS. 1 and 2 the number may vary from two transmitters to some larger number. Each transmitter channel operates on the same carrier frequency and comprises a phase adjuster 14, a length of transmission line (TL), a filter 16 and a transmitter (Tx) 18 (the suffix a-d being indicative of presence in channel a-d, respectively). In accordance with the invention, signal source 12 provides each transmitter channel with an identical digital data packet that includes a preamble and/or a midamble. The preamble and the midamble each consists of a sequence of symbols that are used by a mobile simulcast receiver 20 of FIG. 3 to initially acquire the channel impulse response and to establish synchronization.

Figure 4:
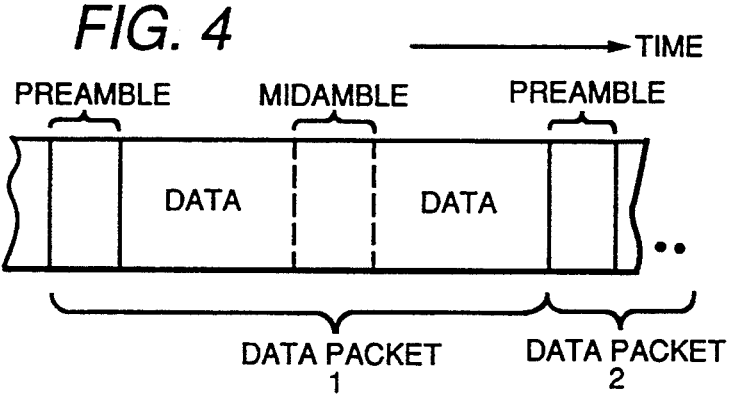
FIG. 4 is a schematic illustration, with respect to time, of a digital data packet.

In the digital simulcast system considered herein, data is transmitted in packets. Each packet, as illustrated in FIG. 4, includes a header or preamble followed by data containing message information. The preamble consists of a sequence of data symbols recognizable by an equalizer in the receiver and is used to establish synchronization and provide the equalizer with an estimate of the channel impulse response. If the data packet is lengthy, the equalizer may have to be periodically provided with a new estimate of the channel impulse response. For this purpose a second sequence of known symbols can be employed approximately mid-way through the data packet and is referred to as a midamble. The above description of the data packet is functional and is by no means complete. A more practical data packet structure will include additional sectoring of the data packet for various signalling functions. However, for the purpose of gaining an understanding of the operation of the invention the above description is sufficient.

Figure 3:
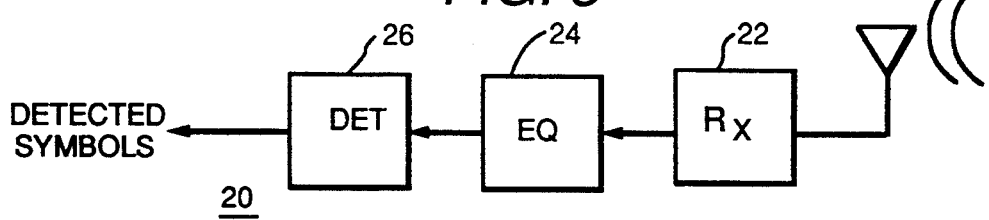
FIG. 3 is a simplified block diagram of the receiver of FIG. 1.

The mobile simulcast receiver 20 of FIG. 3 includes a receiver stage (Rx) 22 comprised of RF amplifiers, mixers, and similar well known circuitry. The output signal of receiver stage 22 is provided to an adaptive equalizer (EQ) 24 and thence to a detector (DET) 26. In equalizer 24 the channel variations are tracked by an adaptive method that operates in accordance with one of several presently preferred equalizer techniques that are described in detail below.

The use of an equalizer for receiving a simulcast broadcast advantageously provides for the automatic alignment of simulcast transmissions wherein digital information is impressed on the RF carrier by a Frequency Shift Keying (FSK) modulation technique, by a phase shift keying (PSK) modulation technique, by a Quadrature Amplitude Modulation (QAM) technique, or by any suitable modulation technique. In the simulcast system according to the teaching of the invention, the only base station adjustment that is made is a calibration to maintain the overall time alignment between transmitters to within a maximum delay spread that is correctable by the chosen equalizer 24. If desired, this base station calibration can be made automatic by employing, preferably, a time domain implementation of the frequency domain technique taught in the above mentioned article entitled "Delay Spectrum Method Using Cross-Spectrum For Multitransmitter Simulcasting" by J. Oka et al.

Equalizer types suitable for implementing Equalizer 24 are the Decision Feedback Equalizer (DFE) and an equalizer based on a Maximum Likelihood Sequence Estimator (MLSE). The MLSE method employs the well known Viterbi algorithm and is also referred to in the art as a Viterbi Equalizer. Implementations using techniques such as Lattice-DFE or Kalman DFE may be preferred for delay spreads between arriving signals that exceed 1-2 digital symbol time durations. For delay spreads that are less than this value, a modified MLSE-VA equalizer technique is usually preferred. This is because the computational complexity of the MLSE-VA technique increases exponentially with delay spread (expressed in symbol duration). This is particularly significant when a modulation scheme with large signaling alphabets are used.

The MLSE-VA and DFE techniques have been researched in detail for use in the European CEPT/GSM cellular radio system. Results of this research are reported by, for example, R. D'Avella et al. in "An Adaptive MLSE Receiver for TDMA Digital Mobile Radio", IEEE Journal on Selected Areas in Communications, Vol. 7, No. 1, pp. 122-129, January 1989, G. D'Aria et al. in "Design and Performance of Synchronization Techniques and Viterbi Adaptive Equalizers for Narrowband TDMA Mobile Radio", proceedings of 3rd Nordic Seminar on Digital Land Mobile Radio Comm., Copenhagen, Denmark, Sept. 13-15, 1988 and by A. Baier et al. in "Bit Synchronization and Timing Sensitivity in Adaptive Viterbi Equalizers for Narrowband TDMA Digital Mobile Radio Systems", proceedings of IEEE Vehicular Technology Conference, Philadelphia, pp. 372-382, 1988. These papers by D'Avella et al., D'Aria et al. and Baler et al. are all incorporated by reference herein.

Another MLSE demodulation approach is described by G. D. Forhey in "Maximum-Likelihood Sequence Estimation of Digital Sequences in the Presence of Intersymbol Interference", IEEE Trans. Info. Theory, Vol. IT18, pp. 363-378, May 1972, and is incorporated herein by reference. Forney's approach uses a Viterbi algorithm, to realize the maximum likelihood sequence estimator, with a squared metric that is derived based on the assumption that the additive noise in the received signal, at the input of the maximum likelihood sequence estimator, is white and Gaussian. That is accomplished through the use of a whitening filter at the input of the maximum likelihood sequence estimator.

Another MLSE approach is described by G. Ungerboeck in "Adaptive Maximum Likelihood Receiver for Carrier Modulated Data Transmission Systems", IEEE Trans. Comm., Vol. COM-22, No. 5, pp. 624-636, May 1974, and is incorporated herein by reference. Both of these conventional MLSE approaches (Forney and Ungerboeck) employ a matched filter followed by a MLSE algorithm and an auxiliary channel estimation scheme.

A modified MLSE-VA equalizer for use with the proposed U.S. cellular system is disclosed by S. Chennakeshu, A. Narasimhan and J. B. Anderson in copending and commonly assigned U.S. patent application Ser. No. 07/753,578, filed concurrently herewith, entitled "Adaptive MLSE-VA Receiver for Digital Cellular Radio". As will now be described this MLSE-VA technique employs a modified Viterbi algorithm and includes a matched filter that is partitioned into a fixed transversal filter and an adaptive transversal filter. A Complex Fast-Kalman algorithm is described therein as a method to obtain an initial estimate of the channel impulse response, and is an extension of a type taught by D. Falconer et al. in "Application of Fast Kalman Estimation to Adaptive Equalization", IEEE Trans. Comm., Vol. COM26, No. 10, pp. 1439-1446, October 1978, which is incorporated herein by reference. The extensions made to Falconer's technique provide for the use of a complex form without matrix inversions and to improve the stability of the technique in the presence of round-off errors through the addition of an appropriate dither signal.

This modified MLSE-VA technique of Ser. No. 07/753,578 is now shown to also be advantageously employed for achieving the automatic alignment of simulcast transmissions wherein the digital information is impressed on each of a plurality of RF carriers by a suitable modulation technique.

There is first described an embodiment of a Maximum Likelihood Sequence Estimator for processing data transmitted over a white Gaussian noise channel having ISI. A sampled signal received over such a channel may be represented as:

$$r(j) = \sum_{k=-N}^{N} I(j-k) f(k) + v(j) \, j \in N_s \qquad (1)$$

where j is the sampling instant, $\{I(n)\}$, $n \in N_s$ represents the transmitted data symbols, $N_s$ denotes a number of symbols in a transmitted data packet and $f(k) = g(k) * h(k)$, where $\{g(k), -N_g \leq k \leq N_g\}$ denotes samples of the transmit filter's impulse response having a duration $2N_g + 1$ symbol intervals, and $N_g$ represents the number of samples modified by the input response of the transmit filter. $\{h(k)\}$ denotes samples of the channel impulse response (CIR) which are assumed to be non-zero only for $(-N \leq k \leq N)$. $\{v(j)\}$ are white Gaussian noise samples.

For a received signal of the form given by equation (1) an optimum demodulator can be shown to comprise a matched filter followed by a MLSE, as indicated by Ungerboeck in the aforementioned article entitled "Adaptive Maximum Likelihood Receiver for Carrier Modulated Data Transmission Systems", IEEE Trans. Comm., Vol. COM-22, No. 5, pp. 624-636, May 1974. The MLSE must observe the sequence $\{r(n)\}$. Ungerboeck shows that the optimal estimate of the sequence $\{I(n)\}$ is the estimate that assigns the maximum value to the metric:

$$J_n(\tilde{I}(n)) = J_{n-1}(\tilde{I}(n-1)) + \qquad (2)$$

$$Re\left[\tilde{I}^*(n)\left(2z(n) - s(0)\tilde{I}(n) - 2\sum_{m \leq n-1} \tilde{I}(m)s(n-m)\right)\right];$$

where Re indicates the real part of quantity in [.]. (Note: in equation (2), within the brackets, we are dealing with complex quantities expressed as A+jB, A is the real part and B is the imaginary part.) In addition, m is the index of summation, and $$z(n) = \sum_{k=-N_S-N}^{N_S+N} \tilde{f}^*(k) r(n+k)$$

where $\{\tilde{f}(n)\}$ corresponds to an estimate of $\{f(n)\}$, and where $$s(l) = s^*(-l) = \sum_{k=-N}^{N} \tilde{h}(k) \tilde{h}^*(k+l). \qquad (3)$$

The s(1) terms are referred to as signal elements and are obtained from an autocorrelation of the CIR $\{h(n)\}$. The term "l" is represented as a lower case "L" not a numeral "1" (one). Since the CIR is of finite duration, s(1) equals zero for $|l| > N$. Using this condition in the metric expressed in Equation (2) the following metric results:

$$J_n(\tilde{I}(n)) = J_{n-1}(\tilde{I}(n-1)) + \qquad (4)$$

$$Re\left[\tilde{I}^*(n)\left(2z(n) - s(0)\tilde{I}(n) - 2\sum_{m=1}^{N} \tilde{I}(n-m)s(m)\right)\right].$$

It should be noted that this metric can also be arrived at through alternate approaches.

For a digitally modulated signal with an alphabet size V, a maximum likelihood estimation of a sequence of length L would require computation of $V^L$ metrics, as defined by Equation (2), corresponding to the $V^L$ possible sequences. The alphabet size corresponds to the number of unique symbols constituting the signaling set. The Viterbi algorithm, as indicated by both Forhey and Ungerboeck in the above mentioned articles, provides an efficient procedure for finding the best sequence from among the $V^L$ possible sequences.

As indicated above, the optimum demodulator for a signal corrupted by white Gaussian noise and ISI comprises a matched filter followed by a Maximum Likelihood Sequence Estimator. In order to describe the proposed MLSE-VA equalization technique a candidate digital transmission scheme employing pi/4-Shifted-DQPSK (differentially encoded Quadrature Phase Shift Keying) modulation is considered. pi/4-Shifted-DQPSK will be employed in the U.S. digital cellular radio system and is representative of the general class of quadrature modulated digital signals. By this is meant that each signal, in the class, can be represented by an in-phase component (I) and quadrature component (Q), which are often denoted by the pair (I,Q). QAM and PSK signals belong to this general class. Some FSK signals can also be approximated and represented as such. Hence, pi/4-Shifted-DQPSK is a suitable digital modulation for use in the following description of the MLSE-VA equalization technique.

Figure 5A:
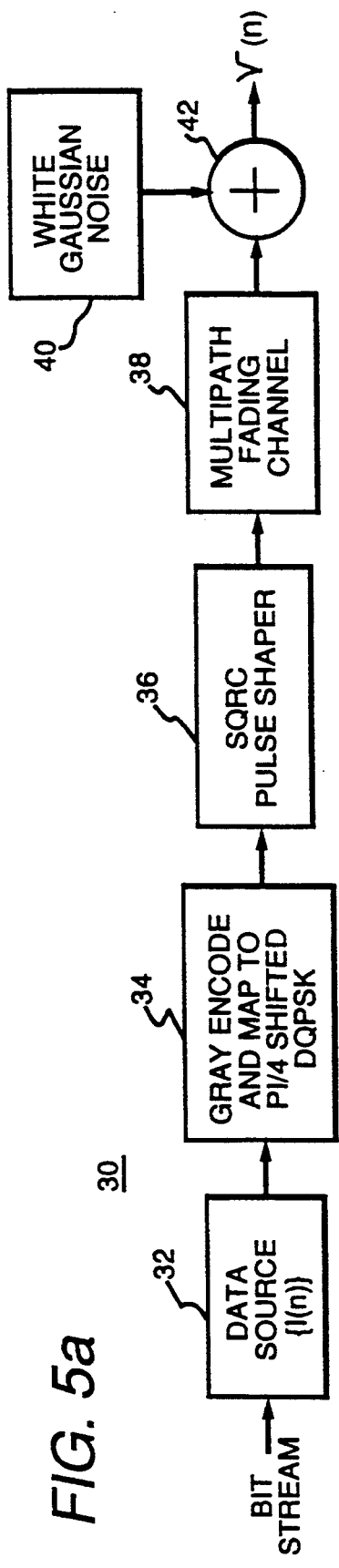
FIG. 5a is a block diagram illustrating the transmitter channel used in the RF transmitters of FIG. 1.

The block diagram of a transmitter that generates equivalent signals at baseband of the candidate transmission scheme 30 and channel for generating a signal corrupted by white Gaussian noise and ISI is shown in FIG. 5a, wherein it can be seen that pairs of input data bits are formed into a sequence $\{I(n)\}$ by data source 32, which is Gray encoded and applied to pi/4-Shifted-DQPSK encoder 34. The output signal from encoder 34 is provided to a pulse shaper (or transmit filter 36), and the pulse shaper output signal is supplied to a multipath fading channel 38. The effect of Multipath Fading is applied to the signal by channel 38. The signal from channel 38 has added thereto, in a summing junction 42, a white Gaussian noise component 40. It is the output signal v(n) of summing junction 42 that is to be received by the mobile receiver and which must be accurately demodulated to extract the intelligence therefrom.

In the demodulator the matched filter is required to be adaptive because it must be matched to the convolution of the impulse response of the transmit filter 36 and the time varying channel impulse response (CIR) introduced by channel 38. For example, for a Square Root Raised Cosine filter, which can be approximated by a 10 tap filter with taps at symbol spacings and a channel introducing one symbol of interference, the matched filter of the demodulator requires a length of at least 11 taps. In a practical implementation the matched filter of the demodulator may require a much larger number of taps. However, adaptation of many taps is computationally expensive and may be unacceptable for achieving satisfactory real-time performance. To reduce computational complexity it is desirable to adapt only from two to four taps.

Figure 5B:
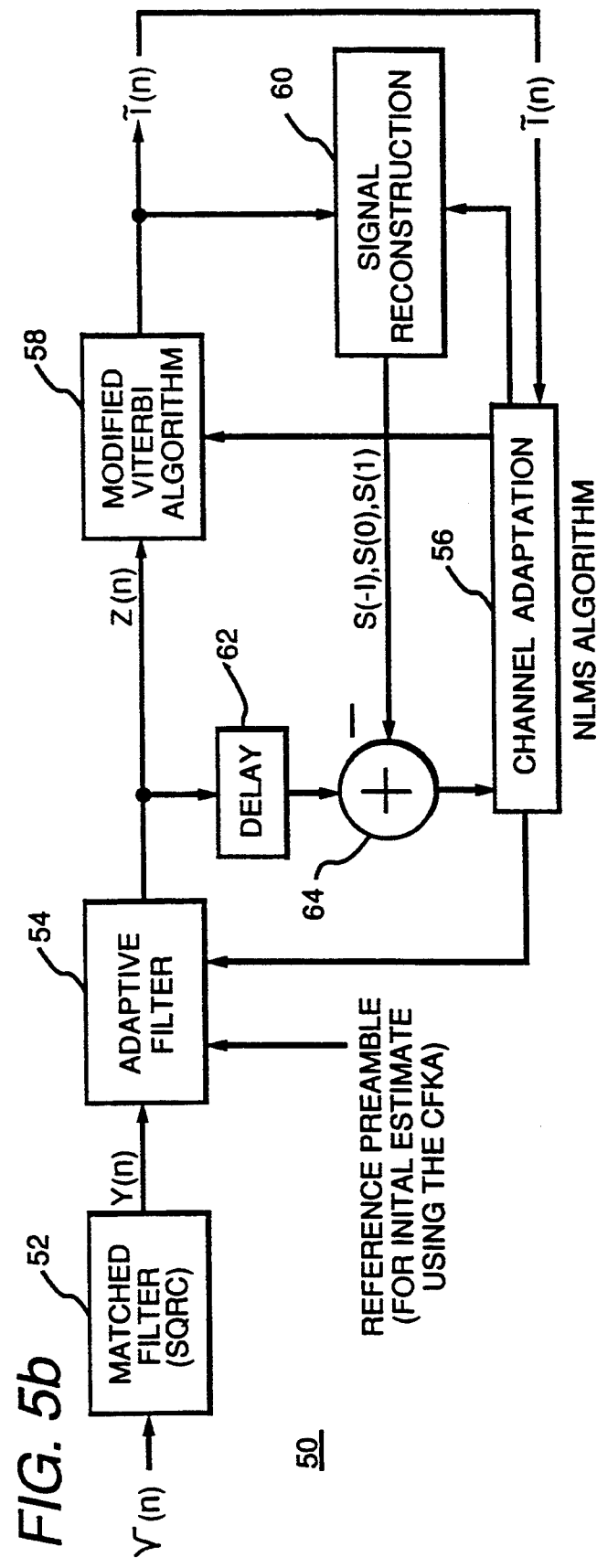
FIG. 5b is a block diagram showing an adaptive MLSE-VA embodiment of the invention.

FIG. 5b illustrates, in accordance with a preferred embodiment of the invention, an MLSE-VA demodulator 50 that is especially adapted for demodulating this white Gaussian noise and ISI corrupted received signal. The invention provides for reducing the complexity of adaptation of the matched filter by partitioning, or splitting, the matched filter into two sections. The first section is comprised of a fixed transversal filter 52 that is matched to the Square Root Raised Cosine transmit filter 36 of the transmitter. This filter characteristic can be approximated by a suitably designed IF filter. The second section is comprised of an adaptive filter 54 that is matched to the estimated channel characteristics. For a channel where the signal that is received is a combination of two rays (a two ray channel model), this presently preferred configuration requires adaptation of only two to four taps that are symbol spaced or fractionally spaced one from the other.

At the beginning of each of the data packets of FIG. 4 the adaptive filter 54 is initialized with an estimate of the CIR. This estimate is preferably obtained using a complex fast Kalman algorithm (CFKA) that operates over a known sequence of symbols. The operation of the CFKA is disclosed in commonly assigned U.S. patent application Ser. No. 07/754,105, filed concurrently herewith, entitled "Decision Feedback Equalization for Digital Cellular Radio" and is also described below.

For a relatively short preamble a Recursive Least Squares (RLS) algorithm, such as the CFKA, is employed to obtain a satisfactory initial estimate of the CIR.

Following the data packet preamble and during the frame data slot the filter coefficients are adapted using an output signal from a Channel Adaptation block 56 that operates in accordance with a normalized least mean square error (NLMS) algorithm. Although the NLMS technique exhibits slower convergence than the CFKA, it has an adequate tracking performance with a significant reduction in complexity over the CFKA technique. The NLMS tracking algorithm, when adopted, operates on complex data as follows:

$$(i) e(n) = z(n) - [s(0)\tilde{I}(n) + s(1)\tilde{I}(n-1) + s^*(-1)\tilde{I}(n+1)]$$

-continued $$(ii) r(n) = r(n-1) + |y(n)|^2 - y|(n-N)|^2$$

$$(iii) \tilde{h}(n) = \tilde{h}(n-1) + \frac{e^*(n)}{r(n)} y(n)$$

where y(n) denotes the vector [y(n) y(n−1) ... y(n−N+1)] and $\tilde{h}$(n) denotes the vector [$\tilde{h}_n(1)\tilde{h}_n(2)$ ... $\tilde{h}_n(N)$] representing the estimated CIR, as per the first step 111 in the flow chart of FIG. 5c.

Another method for obtaining an estimate of the channel CIR involves a correlation-based search using the preamble, as described in the aforementioned articles by R. D'Avella et al. "An Adaptive MLSE Receiver for TDMA Digital Mobile Radio", IEEE Journal on Selected Areas in Communications, Vol. 7, No. 1, pp. 122–129, January 1989, G. D'Aria et al. "Design and Performance of Synchronization Techniques and Viterbi Adaptive Equalizers for Narrowband TDMA Mobile Radio", proceedings of 3rd Nordic Seminar on Digital Land Mobile Radio Comm., Copenhagen, Denmark, Sept. 13–15, 1988 and by A. Baier et al., "Bit Synchronization and Timing Sensitivity in Adaptive Viterbi Equalizers for Narrowband TDMA Digital Mobile Radio Systems", proceedings of IEEE Vehicular Technology Conference, Philadelphia, pp. 372–382, 1988. This alternative method is comparable to use of the RLS algorithm only if the preamble sequence has certain desirable correlation properties.

The MLSE demodulator 50 is implemented using a modified Viterbi algorithm at block 58, which is described by G. Ungerboeck in "Adaptive Maximum Likelihood Receiver for Carrier Modulated Data Transmission Systems", IEEE Trans. Comm., Vol. Com. 22, No. 5, pp. 624–636, May 1974, and herein incorporated by reference. The modified Viterbi Algorithm follows the same procedure as the Viterbi Algorithm for Maximum Likelihood Sequence Estimation, the latter being described by G. D. Forney in "Maximum Likelihood Sequence Estimation of Digital Sequences in the Presence of Intersymbol Interference", IEEE Trans. Info. Theory, Vol. IT 18, pp. 363–378, May 1972, with the exception that the conventional squared metric employed in the Viterbi algorithm is replaced by the metric defined in equation (4). The Forney paper is herein incorporated by reference.

Figure 5C:
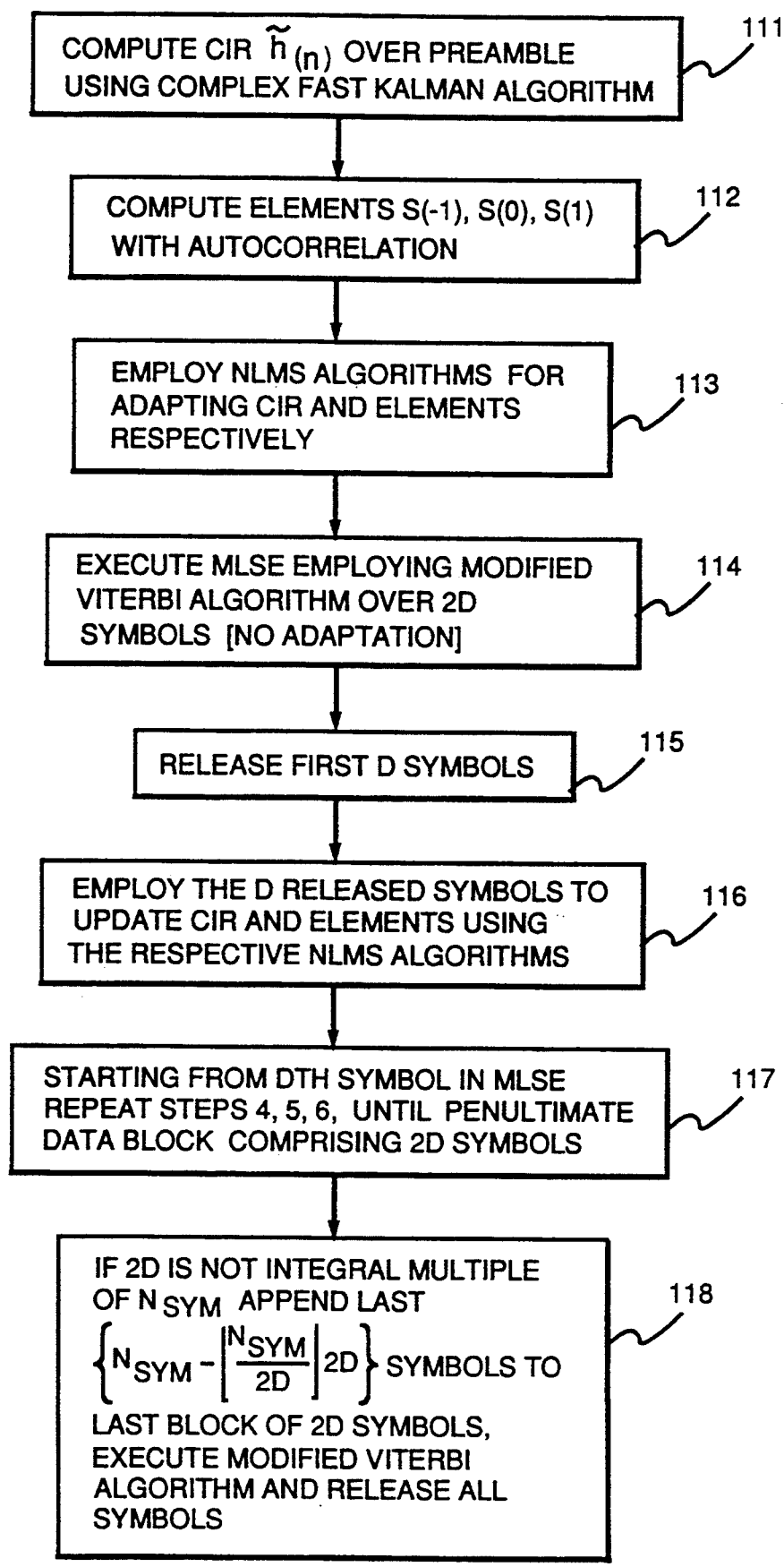
FIG. 5c is a flow chart illustrating a method of operation of the invention.

In order to compute equation (4) it is necessary to determine the signal elements {S(1)}, as indicated at step 112 of FIG. 5c. The signal elements S(−1), S(0), S(1) can be formed as the autocorrelation of the estimated CIR as given by equation (3). However, this method generates poor estimates of the signal elements due to misadjustment error in the estimated CIR, resulting from use of the NLMS algorithm. Therefore, the signal elements are directly estimated using an NLMS algorithm that exploits the symmetry property described by equation (3). With N=1, this preferred NLMS algorithm operates in accordance with step 113 of the flowchart of FIG. 5c.

Figure 6:
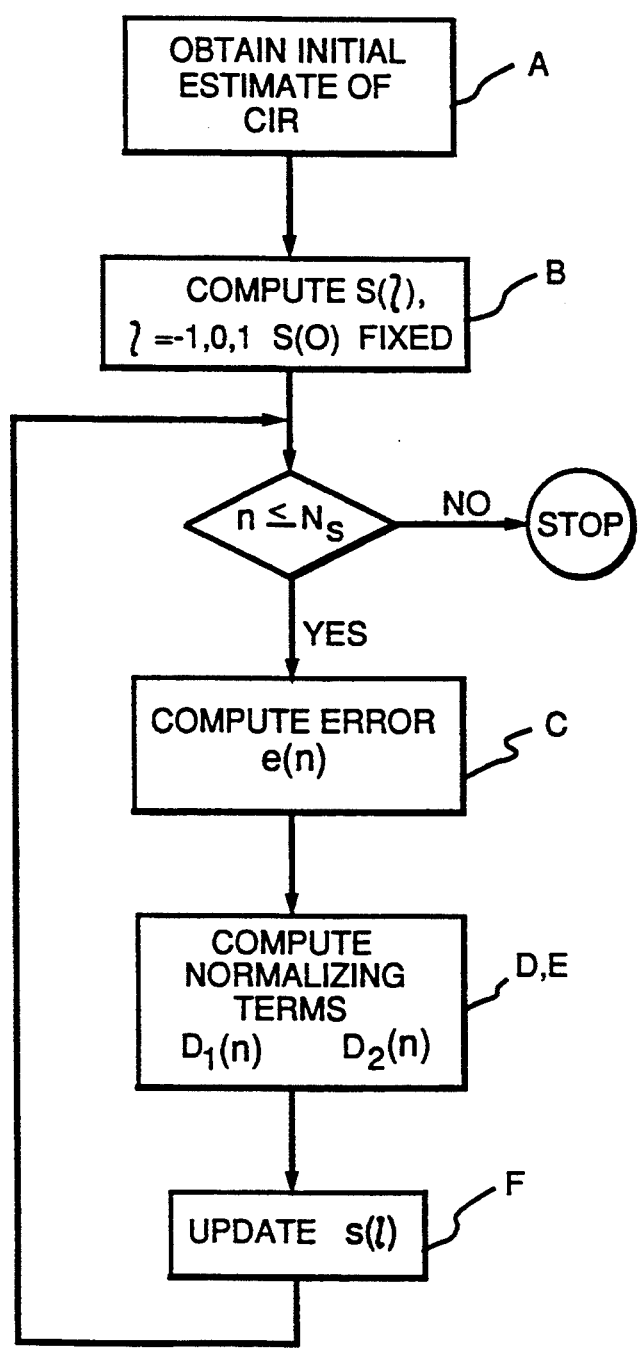
FIG. 6 is a flow chart depicting the operation of a normalized least mean square error (NLMS) algorithm used in conjunction with the receiver for the adaptive MLSE-VA embodiment of the invention.

FIG. 6 is a flowchart illustrating a method of operation of the invention. At step A an initial estimate {h(n)} of the CIR is obtained through the CFKA. At step B there is computed s(1), 1=−1, 0, 1 from Equation (4). Next, at step C and for n<$N_s$, the error is computed in accordance with Equation (5) as follows:

$$e(n) = z(n) - [s(0)\tilde{l}(n) + s(1)\tilde{l}(n-1) + s^*(-1)\tilde{l}(n+1)] \quad (5)$$

Subsequent steps D and E involve computing the following:

$$D_1(n) = 3 |\tilde{l}(n+1)|^2 + \tilde{l}(n-1)|^2, \text{ and} \quad (6)$$

$$D_2(n) = 3 |\tilde{l}(n-1)|^2 + \tilde{l}(n+1)|^2, \quad (7)$$

where $D_1(n)$ and $D_2(n)$ are normalizing terms. Finally, at step F, $s_n(1)$ is updated as:

$$s_n(1) = s_{n-1}(1) + \frac{e^*(n)}{D_1(n)} \tilde{l}(n+1) + \frac{e(n)}{D_2(n)} \tilde{l}^*(n-1) \quad (8)$$

For this method s(O) is kept fixed and is not updated. It is noted that $D_1(n)$ and $D_2(n)$ are constants equal to four for pi/4-shifted-DQPSK and need not be computed repeatedly.

It should also be noted that in equation (8) subscripts have been added to s (1) to indicate their time dependence. This time dependence is implied throughout the MLSE-VA description but has not been explicitly shown in all previous equations where the elements s(1) appear.

Equations (5), (6) and (7) present one method to form the elements {s(1)}. Another method is to compute the elements {s(1)} directly from the estimated CIR using equation (3). However, this method requires that the estimated CIR, represented by the vector for $\tilde{h}$(n) should be smoothed. Computation of the elements using this algorithm is as follows:

Step 1
Compute $\tilde{h}(n) = [\tilde{h}_n(1)\tilde{h}_n(2) \ldots \tilde{h}_n(N)]$ as before.
Step 2

$$\sigma(n) = \gamma \sigma(n-1) + 1$$

with an initial value of $\sigma(0)=0$ and $\gamma$ chosen to be a value between 0.9–0.95.

Step 3

$$\tilde{h}_s(n) = \tilde{h}_s(n-1) + \frac{1}{\sigma(n)} [\tilde{h}(n) - \tilde{h}_s(n)]$$

where $\tilde{h}_s(n)$ is the vector of smoothed CIR coefficients denoted by $[\tilde{h}_{sn}(1)\tilde{h}_{sn}(2) \ldots \tilde{h}_{sn}(N)]$. The subscript sn denotes a smoothed estimate at time n.

Step 4

$$s(1) = s^*(-1) = \sum_{k=1}^{N} \tilde{h}_{sn}(k)\tilde{h}_{sn}(k+1)$$

In the equalizer considered herein 1=−1,0,1. The value of s(0) is kept fixed and is not updated at each time instant. The value of s(0) is set equal to the power in the CIR components that have been estimated using the CFKA over the preamble sequence. s(0) is kept fixed at this value and is not updated at each time instant. s(1) and s(−1) are updated with time as indicated in Step 4 of the above algorithm. For instance, at the $n^{th}$ instant s(1) and s(−1) are computed as follows:

$$s(1) = \tilde{h}_{sn}(1)\tilde{h}_{sn}(2)$$

$$s(-i) = s^*(1)$$

A further consideration in operating MLSE-VA demodulator 50 (FIG. 5b) is the selection of an appropriate decision depth (D) for the Viterbi algorithm. The decision depth is a function of the rate of adaptation required and also of the fading characteristics of the channel. As such, the particular value of D may best be individually determined for each particular application (step 114 of FIG. 5c). It is noted that the SQRC matched filter 52 of FIG. 5b and the MLSE introduce a total delay of D+N symbols. Thus, an implementation of the adaptation algorithm must account for this delay by the inclusion of a delay 62 at the input to a summing junction 64 of MLSE-VA demodulator 50. The signal reconstruction function 60 reconstructs the signal by convolving the estimated symbols {Ĩ(n)} with the signal elements as follows:

$$\text{reconstructed signal } \hat{z}(n) = \sum_{k=-N}^{N} s(k)\tilde{I}(n-k), \quad (9)$$

and applies the reconstructed signal to the summing junction 64. The adaptive filter 54 operates to adjust the channel impulse response estimate and the signal elements in a manner to minimize the mean squared error between $Z(n)$ and $\hat{z}(n)$.

A block update adaptation technique is employed in the MLSE-VA demodulator implementation. In this technique the modified Viterbi algorithm is applied on the first 2D stages, and D symbols corresponding to the first D stages are released (step 115 of FIG. 5c). These D symbols are employed to adapt the adaptive filter coefficients (channel estimate) and the signal elements. Next, the modified Viterbi algorithm is restarted and applied once more for 2D stages beginning at the Dth stage and, once again, the first D symbols are released for adaptation of the adaptive filter coefficients (channel estimate) and signal elements (step 116 of FIG. 5c). This procedure of releasing D symbols, updating and running the modified Viterbi algorithm on blocks of length 2D is continued until the end of the received slot (step 117 of FIG. 5c). If 2D is not an integral multiple of the number of symbols in the slot ($N_{sym}$), the last $\{N_{sym} - [N_{sym}/2D]2D\}$ symbols are appended to the last block and the modified Viterbi algorithm is applied to the augmented last block (step 118 of FIG. 5c). For this last block all symbols are released upon reaching the last stage. This technique implies that the last few symbol decisions may be unreliable. However, when transmitting speech the least important bits in every speech frame may be placed at the end of the slot to mitigate the effect of the unreliable decisions.

In the modified Viterbi algorithm described above, there is a delay of D symbol periods, due to the decision depth (i.e., how many symbols are looked back to in making a decision) associated with the CIR and element updates. This results in the updated CIR and elements lagging the true CIR and corresponding element values, causing performance degradation especially at high vehicle speeds. This effect may be minimized by using a fixed extrapolator to predict the current CIR (at time n) using the estimated CIR (at time n-D) as described in an article entitled "New Adaptive Viterbi Detector for Fast-Fading Mobile Radio-Channels", by E. Dahlman, Electronics Letters, Sep. 13, 1990, Vol. 26, No. 19, pages 1572-1573. The latter article, which is herein incorporated by reference, describes the use of a simple fixed extrapolator in conjunction with a Recursive Least Squares CIR estimation algorithm. This technique is readily adaptable for NLMS CIR estimation and NLMS element estimation algorithms. The algorithm for enhancing CIR estimates is as follows:

$$\tilde{h}_n(j) = \tilde{h}_{n-D}(j) + \delta[\tilde{h}_{n-D}(j) - \tilde{h}_{n-D\epsilon}(j)] \text{ for } j=1,2\ldots N, \quad (10)$$

where D is the decision depth delay, $\delta$ is the gain term of the extrapolator and $\epsilon$ is the step size of the extrapolator and is related to $\delta$ as follows, $\delta = D/\epsilon$. For a given $\epsilon$, although $\delta$ is chosen based on a suitable decision depth D, it is noted that $\delta$ must also be selected to minimize the increase in the random noise in the CIR estimates, which is shown to be $1+2\delta+2\delta hu\,2$ in the aforementioned reference. As an example, if D=10 and $\epsilon=10$ then a value of $\epsilon=0.8-1$ is a reasonable choice.

A similar technique can be adopted to estimate the element s(1) at time n from an estimate at time n-D.

Having thus described the modified MLSE-VA equalizer embodiment, further suitable equalizer embodiments are now described.

Another equalization technique employs an Equalizer 24 (FIG. 3) based on an adaptive, fractionally spaced DFE that is disclosed by S. Chennakeshu, A. Narasimhan and J. B. Anderson in copending and commonly assigned U.S. patent application Ser. No. 07/754,105, filed concurrently herewith, entitled "Decision Feedback Equalization For Digital Cellular Radio".

Figure 7:
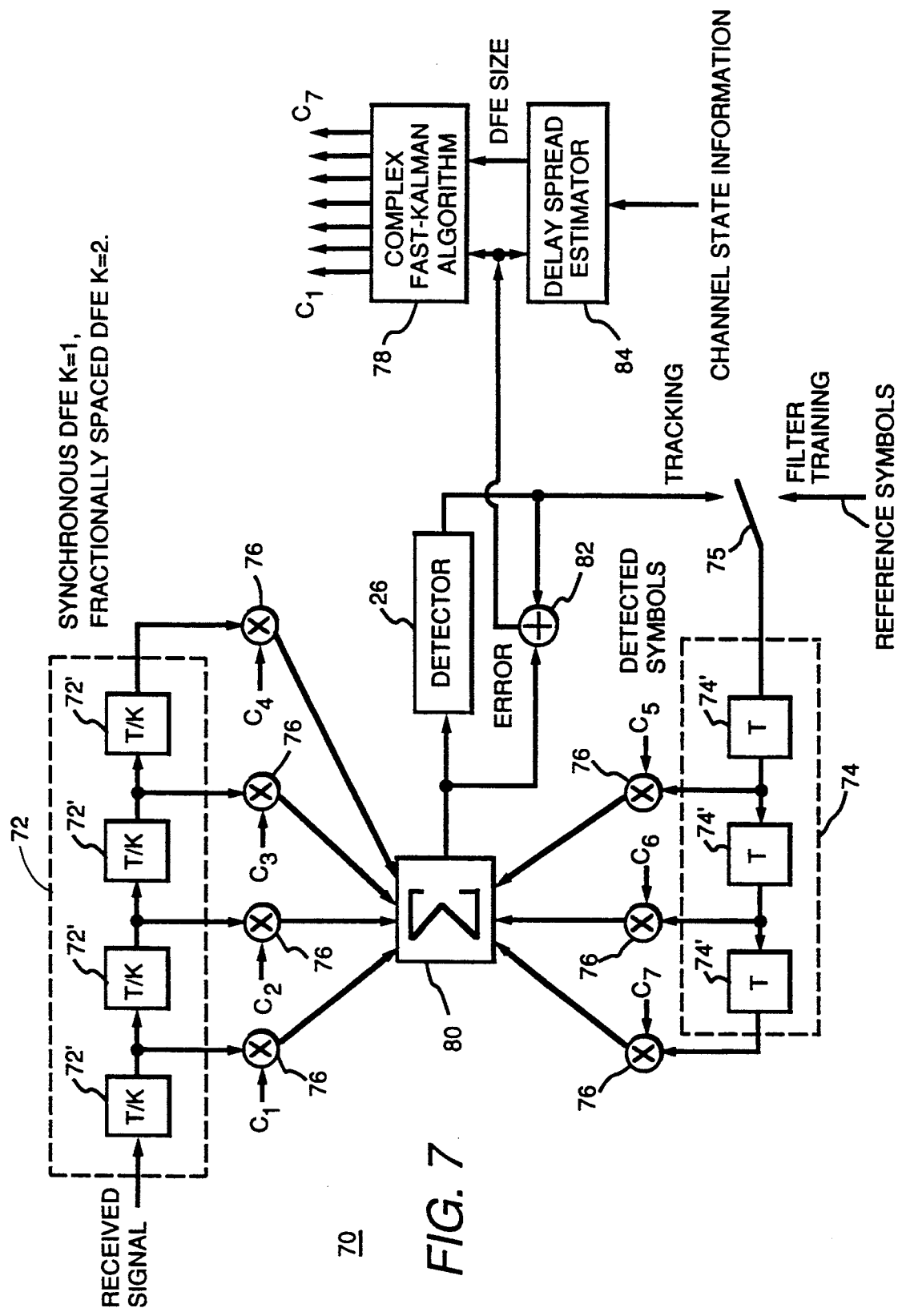
FIG. 7 is a block diagram illustrating a DFE embodiment of the invention having two transversal filters, including a feedforward and a feedback section.

As illustrated in FIG. 7 a DFE equalizer 70 for the receiver includes two transversal filters, comprising a feed-forward filter 72 and a feedback filter 74. The input signal to the feed-forward filter 72 is received data that has been down-converted to baseband. The feedback filter 74 has an input signal that is switchably coupled to a known sequence of reference symbols, corresponding to a transmitted sequence of known symbols during a filter training mode, and to detected symbols during a tracking mode. The feed-forward filter 72 thus compensates for ISI (precursors) arising from multipath propagation delays. The feedback filter 74 is ideally fed with correct detected symbols and thereby serves to remove the ISI due to previous symbols.

In accordance with a synchronous DFE embodiment of the invention the feed-forward filter 72 has filter taps (T) 72' spaced at distances of a symbol period (K=1). In the fractionally spaced DFE embodiment of the invention the feedforward taps 72' are spaced at one half of a symbol period (K=2). Other fractional spacings, such as ⅓, ¼ etc. may also be employed. In both embodiments the feedback filter 74 taps 74' are placed at spacings of a full symbol period. An advantage of employing a fractionally spaced DFE, of the form shown, is that equalization of the spectrum outside of the Nyquist bandwidth is achieved. This makes the fractionally spaced DFE embodiment less sensitive, relative to the synchronous DFE embodiment, to sample timing phase, and to amplitude and phase impairments produced from frontend filters.

DFE 70 further includes a plurality of multiplying nodes 76 having as input signals an output signal of one of the filter taps (72', 74') and also an associated coefficient $C_1-C_7$ generated by a Complex Fast Kalman Algorithm block 78. The multiplying nodes feed a summation block 80 having an output coupled to the detector 26. The output of detector 26 is switchably coupled, through a switching means 75, to the input of the feedback filter 74 during a tracking mode of operation to provide detected symbols thereto. During the training mode of operation the feedback filter 74 is fed with reference symbols corresponding to a preamble sequence or any other preassigned known sequence. An error generating node 82 subtracts the detector 26 input signal from the output signal and generates an error signal that is provided to both the Complex Fast Kalman Algorithm block 78 and also to a Delay Spread Estimator 84. The operation and interaction of these various blocks is described in greater detail below.

As previously stated, the DFE 70 operates in two modes: a training mode and a tracking mode. During the training mode the DFE 70 sets the filter coefficients to an optimum value but does not decode symbols. In the tracking mode the DFE 70 decodes the symbols and follows variations in the channel by adjusting the filter coefficients.

In the training mode the DFE 70 coefficients could be set to an optimum value either by solving a set of linear equations, as indicated by M. K. Gurcan et al., "Assessment of Equalization Algorithm for Dispersive Channels", Land Mobile Radio, Fourth International Conference, Coventry, UK, pp. 81-86, December 1987, which is herein incorporated by reference, or by means of a recursive algorithm. However, the former technique requires knowledge of the duration of the channel impulse response, signal and noise variance and is therefore not practical in many applications. The recursive algorithm, on the other hand, adjusts the coefficients iteratively with the objective of minimizing the mean square error (MSE) between a known data sequence and the output signal of equalizer 70.

An equivalent, but more readily implemented, criterion that is used for iterative algorithms is the least squares (LS) criterion. The LS criterion is described by M. K. Gurcan et al. in the above mentioned article and also by S. Haykin, Adaptive Filter Theory, Chapter 8, Prentice Hall, Englewood Cliffs, N.J., 1986. The Haykin article is herein incorporated by reference.

For a transversal filter-type DFE, two different types of recurslye algorithms may generally be employed. These include gradient algorithms, such as Least Mean Squares (LMS) and Normalized Least Mean Squares (NLMS), and recursive least squares (RLS), or Kalman-type algorithms. The LMS algorithms exhibit slow convergence to optimum coefficient values, and are sensitive to the eigenvalue spread of the channel. However, the LMS algorithms are relatively simple to implement.

The RLS type algorithms exhibit fast convergence and are insensitive to the channel eigenvalue spread. However, these algorithms are complex to implement. The complexity is measured in terms of multiplication and additions in the recursions. The RLS algorithms exhibit a complexity on the order of $N^2$, where N for these algorithms is the total number of DFE coefficients. This complexity can be reduced by using a class of fast recurslye least squares (FRLS) algorithms, which are mathematically equivalent to the RLS algorithms but have a complexity proportional to N. However, the FRLS category of algorithms exhibit a sensitivity to round-off errors.

As such, and in accordance with an aspect of the invention, a Complex Fast Kalman algorithm is preferred. The algorithm is based on an algorithm described by D. Falconer et al. in "Application of Fast Kalman Estimation to Adaptive Equalization", IEEE Trans. Comm. Vol. COM-26, No. 10, pp. 1439-1466, October 1978. The preferred algorithm, however, is extended to a complex form that does not require matrix inversions. The Complex Fast Kalman Algorithm of the invention is implemented in the functional block 78 of FIG. 7 and is applied to the real time demodulation of digital cellular data.

Definitions are set forth below to aid in an understanding of the operation of functional block 78: i) $F_{Np}(n)$: $N \times p$ matrix of forward predictor coefficients with $F_{Np}(0) = O_{Np}$; ii) $B_{Np}(n)$: $N \times p$ matrix of backward predictor coefficients with $B_{Np}(0) = O_{Np}$; iii) $E_{pp}(n)$: $p \times p$ matrix with $E_{pp}(0) = \delta^{-1} I_{pp}$ where $I_{pp}$ is an identity matrix and $\delta$ is chosen to be a small positive number, and where $\delta$ is found to be an estimate of the final mean square error; iv) $K_N(n)$: N-dimensional Kalman gain vector with $K_N(0) = K_N(1) = 0$; v) $K_m^3$ (n): $M = N+p$ extended Kalman gain vector; vi) $\epsilon_p(n|n-1)$, $\epsilon_p(n|n)$: p-dimensional forward prediction error vectors; vii) $V_p(n|n-1)$: p-dimensional backward prediction error vector; viii) $\mu_p(n)$ p-dimensional vector obtained by partitioning $K_e^M$ (n); ix) $M_N(n)$: N-dimensional vector obtained by partitioning $K_M^3$ (n); x) $C_N$ (n) : N-dimensional vector of equalizer coefficients; and xi) $\lambda$: a "forgetting" parameter chosen to be typically between 0.7-1.0. For a transversal filter equalizer, p is set to 1; for a symbol rate DFE, p is set to 2; and for fractionally spaced DFE, p is set to 3. Data Vectors are described below in accordance with the following. i) y(n) corresponds to received data samples. Samples are taken at the symbol rate for the synchronous DFE and at twice the symbol rate for the fractionally spaced DFE, with taps spaced one half of a symbol apart. ii) s (n) = I(n), where I(n) denotes preamble 3 data samples corresponding to the training mode; and s (n) = d(n), where d(n) denotes detected data samples corresponding to the tracking mode. iii) $X_N(n) = [y(n-1) \ldots y(n-N_1)|s(n-2) \ldots s(n-N_2-1)]^T$; where T denotes transpose and $N = N_1 + N_1 + N_2$. $N_1$ represents the number of feed-forward taps 72', while $N_2$ represents the number of feedback taps 74'. iv) $\eta_p(n) = [y(n)|s(n)]^T$. v) $\rho_p(n) = [y(n-N_1)|s(n-N_2-1)]^T$. In accordance with the foregoing definitions the Complex Fast Kalman Algorithm block 78 operates as described below. Starting at n=1 the computations are carried out in the following order:

$$\epsilon_p(n|n-1) = \eta_p(n) - F_{Np}^H(n-1)X_N(n) \qquad (11)$$

$$F_{Np}(n) = F_{Np}(n-1) + K_N(n)\epsilon_p^H(n|n-1) \qquad (12)$$

$$\epsilon_p(n|n) = \eta_p(n) - F_{Np}^H(n)X_N(n) \qquad (13)$$

$$E_{pp}(n) = \qquad (14)$$

$$G_{pp}(n-1) - \frac{G_{pp}(n-1)\epsilon_p(n|n)\epsilon_p^H(n|n-1)G_{pp}(n-1)}{1 + \epsilon_p^H(n|n-1)G_{pp}(n-1)\epsilon_p(n|n)}$$

where $G_{pp}(n-1) = \frac{1}{\lambda} \cdot E_{pp}(n-1)$ $$K_M^e(n) = \left[ \frac{E_{pp}(n)\epsilon_p(n|n)}{K_N(n) - F_{Np}(n)E_{pp}(n)\epsilon_p(n|n)} \right] \qquad (15)$$

$$K_M(n) = \left[ \frac{M_N(n)}{\mu_p(n)} \right] \qquad (16)$$

$$V_p(n/n-1) = \rho_p - (n) - B_{Np}^H(n-1)X_N(n+1) \qquad (17)$$

$$B_{Np}(n) = [B_{Np}(n-1) + M_N(n)v^H(n|n-1)]D_{pp}(n) \qquad (18)$$

-continued $$\text{where } D_{pp}(n) = \left[ I_{pp} - \frac{\mu_p(n)v_p^H(n|n-1)}{1 + V_p^H(n|n-1)\mu_p(n)} \right]$$

where $I_{pp}$ is the pxp identity matrix $$K_N(n+1) = M_N(n) + B_{Np}(n)\mu_p(n) \tag{19}$$

$$e(n) = I(n-1) - C_N^H(n-1)X_N(n) \tag{20}$$

where $X_N(n)$ is defined for the training mode and H denotes conjugate transpose, $$e(n) = d(n-1) - C_N^H(n-1)X_N(n)$$

where $X_N(n)$ is defined for the tracking mode, and $$C_N(n) = C_N(n-1) + K_N(n)e^*(n) \tag{22}$$

where * denotes conjugate.

The operation of the Complex Fast Kalman Algorithm block 78, as described above, has been found to exhibit divergence when implemented with single precision floating point arithmetic using 23 bit mantissa. In practice the DFE 70 is implemented in a digital signal processor with at most single precision floating point arithmetic.

A technique adapted for use in the receiver of FIG. 3, that allows a reduced precision implementation through the use of a uniformly distributed dither signal, is described by S. H. Ardalan et al. in "Sensitivity Analysis of Transversal RLS Algorithms with Correlated Inputs", IEEE International Symposium on Circuits and Systems, Portland, Oreg., May 1989. The Ardalan et al. paper is herein incorporated by reference. The principle of this method is described below.

The round-off error occurring from the use of reduced precision for multiplication or addition depends on the number of bits used to represent the mantissa. This round-off error can be modelled as additive noise having a uniform distribution with zero mean and a variance of $2^{-2B_f}/12$ where $B_f$ represents the number of bits in the mantissa. If an error sample x is drawn from this distribution and subtracted from a reduced precision operation, the result will correspond to an ideal arithmetic operation. This process can be represented, for single precision arithmetic, as follows: MULTIPLY: X Y=SINGLE PRECISION [XY] −x ADDITION: X+Y=SINGLE PRECISION [X+Y] −x
The error sample (x) is referred to as the dither signal and the process is called dithering. It can be seen that since every single precision arithmetic operation requires the addition of a dither signal, the computational complexity increases.

To decrease the number of additions of the dither signal the invention employs the following technique. Instead of adding a uniform random variable after each arithmetic operation there is added a single Gaussian random variable after a set of operations. This technique follows directly from the central limit theorem. For example, consider the set of operations represented by equation (1) in the previously described Complex Fast Kalman algorithm. Assuming p=1 and N=5, this set of operations requires five complex multiplies and one complex addition. This would require, in accordance with conventional practice, the addition of 34 uniform random variables. Instead, and in accordance with this aspect of the invention, all of the operations are performed first and then there is added one complex Gaussian random variable of zero mean and having a variance equal to $$34 \times \frac{2^{-2B_f}}{12}.$$

This addition is done for each equation in the Complex Fast Kalman algorithm block 78. It has also been found that the addition of the dither signal can be made selectively at only those equations in the algorithm block 78 that are found to be sensitive to round-off error, thereby reducing computational complexity even further.

In an evaluation of the performance of the invention disclosed herein it is assumed that symbol timing recovery is perfect and that there is no carrier frequency offset. However, under actual field conditions these two impairments seriously degrade performance of the DFE 70. Therefore, and in accordance with a further aspect of the invention, there is now described method and apparatus to obtain the correct symbol timing and to adjust for a carrier frequency offset.

Figure 8:
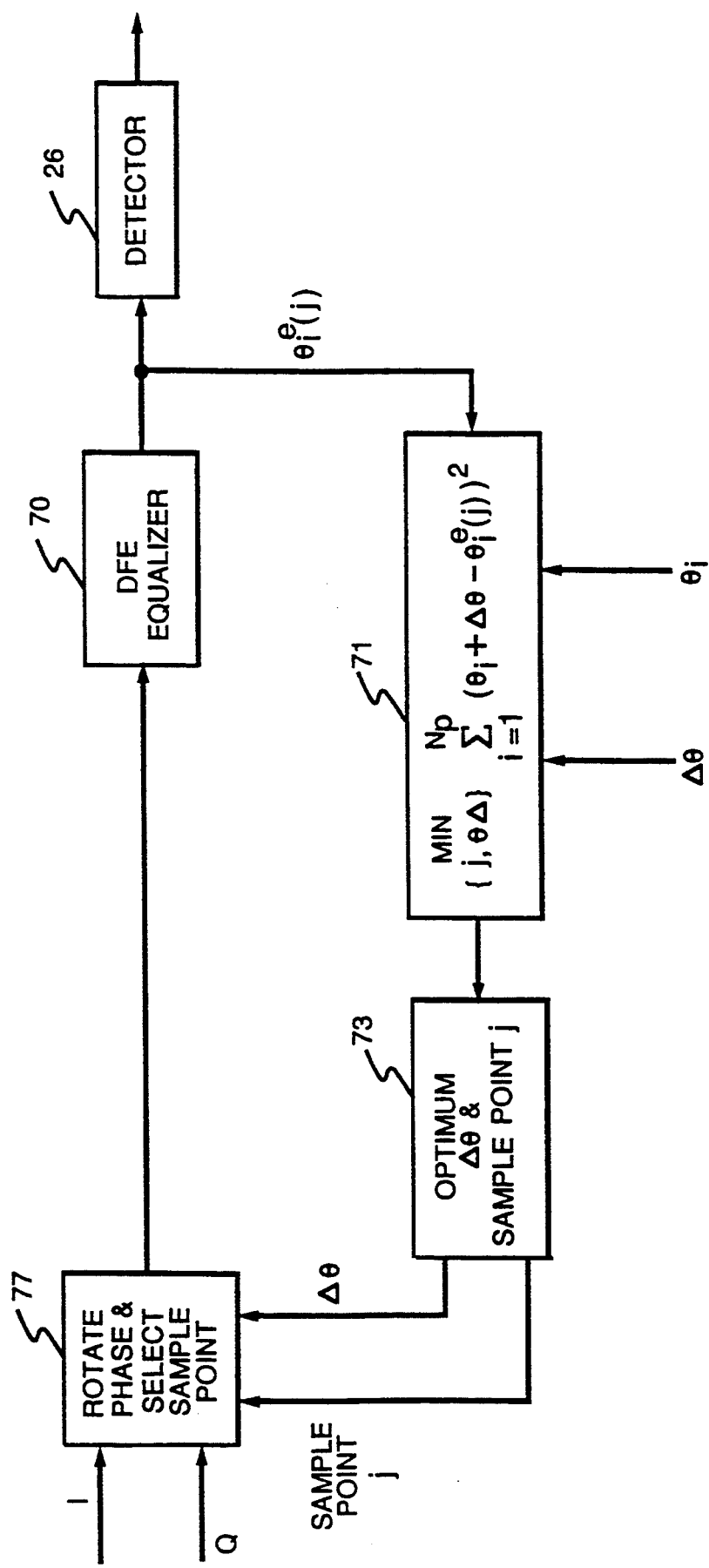
FIG. 8 is a block diagram illustrating DFE operation in a symbol timing acquisition mode.

The principle of the symbol timing and carrier frequency offset estimation technique is as follows. Symbol timing is established by finding a sample which minimizes the sum of the squared error between the decoded symbol and a corresponding preamble symbol, the sum being accumulated over the entire preamble sequence. Alternatively, the symbol timing can be established by finding the sample which minimizes the sum of the squared error between the phase of the decoded symbol and a corresponding phase of a preamble symbol. This alternative embodiment is described herein. Once this sample is identified, and since the number of samples per symbol is known, the symbol timing may be obtained by use of a simple counter. Similarly, the carrier frequency offset is determined by applying a set of fixed carrier phase correction (rotation) values to each sample and determining which of these values minimizes the symbol decoding error. These two techniques for symbol timing and carrier frequency offset estimation are integrated into a single technique that is illustrated in FIG. 8 and described below. This technique employs the preamble symbols as a reference to estimate both the optimum sample point and the carrier phase rotation that minimizes the squared error between the reference sequence and the corresponding decoded sequence. This technique may also be used to "fine tune" the frame/slot synchronization.

Each data packet has a unique synchronization word or preamble that is known to the receiver. The data packet is acquired by establishing frame and packet time synchronization. This is accomplished with a technique that establishes a coarse synchronization position that is accurate to within N1 samples of the correct position, where $N_1 < N_s/2$ and $N_s$ is the number of samples per symbol. Having established this coarse synchronization, $N_2$ ($N_2 > N_1$) data samples on either side of the established packet synchronization position are buffered. Each buffered sample is then sequentially used as a starting point, in the Equations given below, for locating the optimum sampling instant and carrier phase rotation. This technique can be considered as a two-dimensional search procedure that seeks to minimize an objective function with respect to symbol timing and carrier frequency offset. The objective function is defined to be the squared error between the phase angles of the synchronizing word and the corresponding phase angles obtained at the decoder 42 (FIG. 5a) output. This process can be expressed mathematically as:

$$\min_{\{j,\Delta\theta\}} \sum_{i=1}^{N_p} (\theta_i + \Delta\theta - \theta_i^e(j))^2 \quad (23)$$

where, j is the sampling instant $\theta_i$ is the phase angle of the $i^{th}$ symbol of the preamble $\Delta\theta$ is the phase rotation given to the received signal $\theta_i^e(j)$ is the decoded phase angle corresponding to the $i^{th}$ symbol at the jth sampling instant, and Np is the number of symbols in the preamble.

The technique described by Equation 23 obtains an estimate of the phase rotation per symbol. The phase rotation per sample is obtained by dividing $\Delta\theta$ by $N_s$.

It is noted that either absolute phase angles of symbols or differential phase angles between successive symbols may be used in Equation (23). Accordingly, with differential phase angles the summation in Equation (23) goes from i=2 to Np.

The technique embodied in Equation 23 is performed by functional block 71 which receives as its input signal the output signal $\theta_i^e(j)$ from DFE equalizer 70 of the circuitry depicted in block diagram form in FIG. 8. Because the carrier frequency offset may be expected to remain relatively constant over several hundred data packets, the process described by Equation 23 may be modified as follows. First, the two-dimensional search for the optimum sample timing (j) and phase rotation ($\Delta\theta$) at start up or at hand-off is performed at functional block 73 on the output signal of functional block 71. The method subsequently compensates for the phase rotation and thereafter searches for only the optimum sampling instant (j), as indicated at functional block 77, at the start of each data packet.

Figure 9:
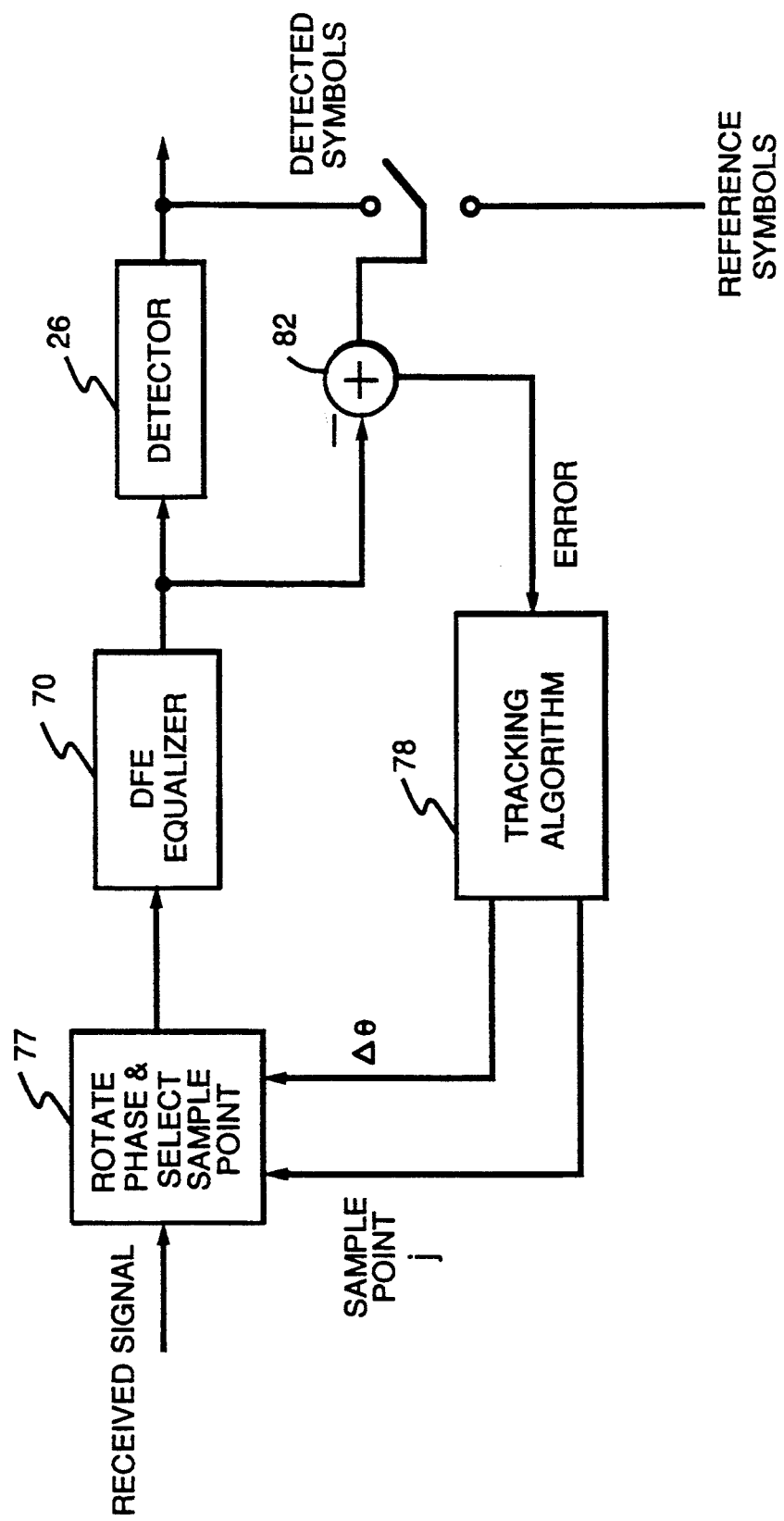
FIG. 9 is a block diagram illustrating DFE operation in a symbol timing tracking mode.

For the case in which fading is very rapid it is likely that the optimum sampling instant may change during the duration of the data packet. This is avoided by continuously adapting the sampling phase using DFE equalizer 70 in a closed loop arrangement as shown in FIG. 9. This technique operates in a decision directed mode, wherein an LMS algorithm may be used to adjust sample timing phase using the received signal and previously decoded symbols.

Another equalization technique is based on an adaptive Lattice DFE (L-DFE). By example, in the articles entitled "Adaptive Lattice Decision-Feedback Equalizers-Their Performance and Application to Time-Variant Multipath Channels", IEEE Trans. Comm. Vol. COM-33, No. 4, pp. 348-356, April 1985 and "A Generalized Multichannel Least Squares Lattice Algorithm Based on Sequential Processing Stages, IEEE Trans. Acoust., Speech, Signal Processing, Vol. ASSP-32, No. 2, pp. 381-389, April 1984, Fuyun Ling and John G. Proakis describe a least squares (LS) L-DFE and a gradient L-DFE. Advantages of L-DFE's are said to include numerical stability, computational efficiency, a flexibility in changing a length of the equalizer and an excellent capability for tracking rapidly time-variant channels. The Ling and Proakis article is herein incorporated by reference.

In this regard, an equalizer based on an adaptive Order Recursive L-DFE is disclosed by S. Chennakeshu, A. Narasimhan and J. B. Anderson in copending and commonly assigned U.S. patent application Ser. No. 07/753,579, filed concurrently herewith, entitled "Order Recurslye Lattice Decision Feedback Equalization For Digital Cellular Radio".

As is now described in greater detail, the Order Recursire L-DFE demodulator embodiment of the invention is also well suited for use in implementing Equalizer 24 of the digital simulcast receiver 20 shown in FIG. 3.

AS illustrated in FIGS. 10a-10d, an L-DFE 90 exploits the order recursive nature of the lattice structure to adaptively vary the number of filter stages (taps), thereby achieving a relatively uniform BER performance over a wide range of channel delay spreads. The order of the DFE is varied by using a time average of accumulated squared error differences between successive stages.

The L-DFE 90 is based on that described by F. Ling and J. G. Proakis in so far as the adaptation algorithm is concerned. However, the L-DFE 90 of the invention is extended to make it order recursive through the addition of a stage reduction algorithm. L-DFE 90 includes a multichannel lattice predictor portion and a joint estimator portion. The lattice predictor portion is comprised of (M=N1−N2) scalar stages 92 (FIG. 10c) followed by (N2−1) two-dimensional stages 94 (FIG. 10b). A first input signal to the L-DFE 90 is the received signal y(t), while a second input signal is the detected symbol $\tilde{X}$(t) fed back from detector 26. The joint estimator portion 90a is comprised of summers.

Figure 10A:
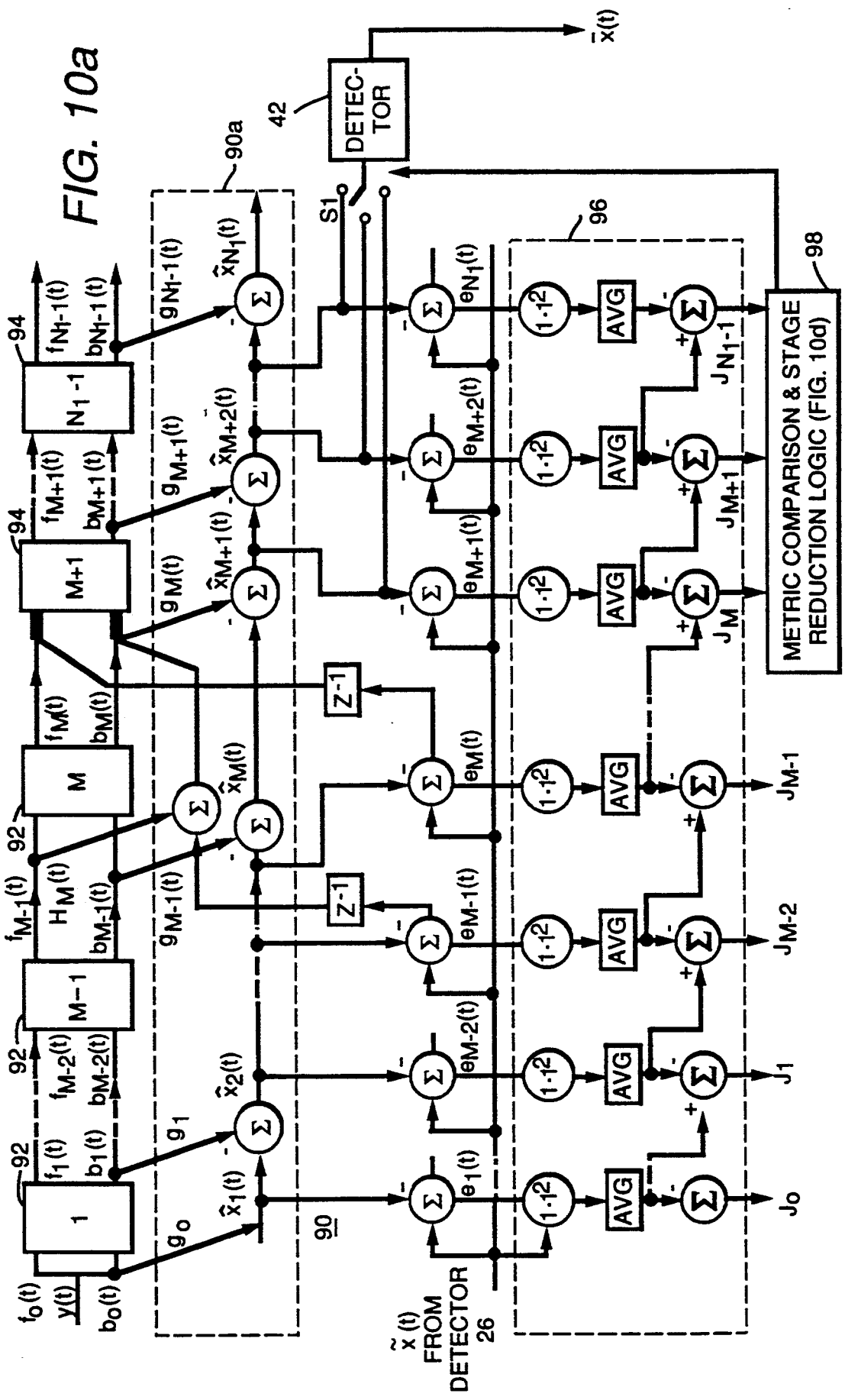
FIG. 10a is a block diagram illustrating an Order Recursive Lattice DFE embodiment of the invention.

As indicated in FIG. 10a, the $f_0(t)$ and $b_0(t)$ input signals to scalar stages 50 (designated 1, M−1 and M, respectively) result in output signals designated $f_1(t)$ and $b_1(t)$, $f_{M-1}(t)$ and $b_{M-1}(t)$, and $f_M(t)$ and $b_M(t)$, respectively. Similarly, signals $f_M(t)$ and $b_M(t)$ are input signals to two-dimensional stages 52 (designated M+1 and $N_1-1$, respectively) which produce output signals designated $f_{M+1}(t)$ and $b_{M+1}(t)$, and $f_{N1-1}(t)$ and $b_{N1-1}(t)$, respectively. The subscript designations for these signals correspond to the designations of the two-dimensional stages.

In FIG. 10a, the term $g_i(t)$ represents a gain factor for the $b_i(t)$ output signal of the ith stage, with the subscript i designating the ith stage producing that signal (where $e_i=0, 1, \ldots N_1-1$), while the symbol $Z^{-1}$ represents a unit delay, the symbol $\Sigma$ represents an algebraic adder circuit, and the term e(t) where e has a subscript i corresponds to the ith stage which represents the error between $\tilde{X}(t)-\hat{x}_i(t)$ for that ith stage. The term $H_M(t)$ represents a gain factor for the output signal designated $f_{M-1}(t)$. The symbol $1.1^2$ represents magnitude squared (for example, $|x|^2$). The designation AVG signifies an averaging circuit which time-averages the input signals supplied thereto while bold face symbol $\Sigma$ signifies an averaging circuit which averages the difference of the input signals thereto.

In an L-DFE 90 training mode of operation an actual transmitted symbol x(t) is used in place of $\tilde{X}$(t). To recover the symbol x(t) the L-DFE 90 employs a linear combination of the received signal y(t), delayed samples y(t−i) of the received signal, and previously detected samples of x(t), namely $\tilde{X}$(t). A generalized derivation of this technique is found in the article "A Generalized Multichannel Least Squares Lattice Algorithm Based on Sequential Processing Stages, IEEE Trans. Acoust., Speech, Signal Processing, Vol. ASSP-32, No. 2, pp. 381-389, April 1984, by F. Ling and J. G. Proakis. This technique is summarized below as an aid in understanding the operation of the L-DFE 90 of the invention. It is noted that boldface characters represent matrices or vectors. Specifically, $f_m(t)$, $b_m(t)$ and $k^x(t)$ are $2 \times 1$ vectors, while $R_m{}^f(t)$, $R_m{}^b(t)$ and $k_m(t)$ are $2 \times 2$ matrices. All other quantities are scalars. $\delta$ is chosen to be a very small positive number, while $\lambda$ is a positive number close to one (typically 0.95-1.0). Unless otherwise stated, all quantities take complex values. Symbols (*), ('). and (H) denote complex conjugate, transpose and conjugate transpose respectively.

Initialization $b_0(t) = y(t)$, $k_M{}^b(0) = 0$ $(M = N_1 - N_2)$ $r_f{}^0(t) = r_0{}^b(t) = \lambda r_0{}^f(t-1) + |y(t)|^2$ $r_0{}^f(0) = 0$, $e_0(t) = \tilde{x}(t), \hat{x}_0(t) = 0$ $a_m(t) = 1, K_m{}^x(0) = 0$, $r_{fm}(0) = r_m{}^b(0) = \delta$ $(m = 1, 2, \ldots, N_1 - N_2 - 1)$ $k_m(0) = k_m{}^x(0) = 0$, $k_m(0) = 0$, $k_m{}^x(0) = 0$ $R_m{}^f(0) = R_m{}^b(0) = \delta I (m = N_1 - N_2, \ldots, N_1)$

Scalar Stages $(0 < m \leq N_1 - N_2)$ unless specified $f_m(t) = f_{m-1}(t) - k_m{}^*(t-1) b_{m-1}(t-1) / r_{m-1}{}^b(t-2)$ (24)

$b_m(t) = b_{m-1}(t) - k_m(t-1) f_{m-1}(t-1) / r_{m-1}{}^f(t-2)$ (25)

$k_m(t) = \lambda k_m(t-1) + a_{m-1}(t-1) f_{m-1}{}^*(t) / b_{m-1}(t-1)$ (26)

$r_m{}^f(t) = r_{m-1}{}^f(t) - |k_m(t)|^2 / r_{m-1}{}^b(t-1)$
$0 \leq m < N_1 - N_2$ (27)

$r_m{}^b(t) = r_{m-1}{}^b(t) - |k_m(t)|^2 / r_{m-1}{}^f(t-1)$
$0 \leq m < N_1 - N_2$ (28)

$\hat{x}_m(t) = \hat{x}_{m-1}(t) + k_m{}^x(t-1) b_{m-1}(t) / r_{m-1}{}^b(t-1)$
$0 \leq m \leq N_1 - N_2$ (29)

$a_m(t) = a_{m-1}(t) - |b_{m-1}(t)|^2 / r_{m-1}{}^b(t)$ (30)

$e_m(t) = \tilde{X}(t) = \hat{X}_m(t)$ $0 \leq m \leq N_1 - N_2$ (31)

$k_m{}^x(t) = \lambda k_m{}^x(t-1) + a_{m-1}(t) e_{m-1}{}^*(t) b_{m-1}(t)$ (32)

Transitional Stage $(M = N_1 - N_2)$ $\hat{b}_m(t) = e_{M-1}(t-1) - k_M{}^b(t-1) f_{M-1}(t) / r_{M-1}{}^f(t-1)$ (33)

$k_m{}^b(t) = \lambda k_m{}^b(t-1) + a_{M-1}(t-1) f_{M-1}{}^*(t-1) e_{M-1}(t-1)$ (34)

$f_M(t) = [f_M(t) e_M(t-1)]'$ (35)

$b_M(t) = [b_M(t) \hat{b}_m(t)]'$ (36)

$R_M{}^f(t) = \lambda R_M{}^f(t-1) + a_M(t-1) f_M(t) f_M{}^H(t)$ (37)

$R_M{}^b(t) = \lambda R_M{}^b(t-1) + a_M(t) b_M(t) b_M{}^h(t)$ (38)

Two Dimensional Stages $(N_1 N_2 < m < N_1)$ unless specified $f_m(t) = f_m(t) - k_m{}^H(t-1)[R_{m-1}{}^b(t-2)]^{-1} b_{m-1}(t-1)$ (39)

$b_m(t) = b_{m-1}(t) - k_m(t-1)[R_{m-1}{}^f(t-1)]^{-1} f_{m-1}(t)$ (40)

$k_m(t) = \lambda k_m(t-1) + a_{m-1}(t-1) b_{m-1}(t-1) f_{m-1}{}^H(t)$ (41)

$R_m{}^f(t) = \lambda R_m{}^f(t-1) + a_{m-1}(t-1) b_{m-1}(t-1) f_{m-1}{}^H(t)$ (41)

$R_m{}^f(t) = \lambda R_m{}^f(t-1) + a_m(t-1) f_m(t) f_m{}^H(t)$ (42)

$R_m{}^b(t) = \lambda R_m{}^b(t-1) + a_m(t) b_m(t) b_m{}^H(T)$ (43)

$a_m(t) = a_{m-1}(t) + a_{m-1}{}^2(t) b_{m-1}{}^H(t) [R_{m-1}{}^b(t)]^{-1} b_{m-1}(t)$ (44)

$\tilde{x}_m(t) = \hat{x}_{m-1}(t) + k_m{}^{xH}(t-1)[R_{m-1}{}^b(t-1)]^{-1} b_{m-1}(t)$
$(N_1 - N_2 \leq m \leq N_1)$ (45)

$e_m(t) = \tilde{x}(t) - \hat{x}_m(t)$ (46)

$k_m{}^x(t) = \lambda k_m{}^x(t-1) + a_{m-1}(t) + a_{m-1}(t) b_{m-1}(t) e_{m-1}{}^*(t)$
$(N_1 - N_2 \leq m \leq N_1)$ (47)

The structure of the algorithm does not permit independent changes in the number of feedforward and feedback stages (taps). However, pairs of stages (i.e., two-dimensional stages) can be added or deleted as needed. The DFE structure may be considered as follows. A 2-D stage comprises a 1-D stage superimposed upon another 1-D stage as if they operate in parallel but are interconnected. The feedback stages are the 1-D stages that are superimposed upon the existing 1-D stages (feed forward) to constitute the 2-D stage. As a result of this structure, if a stage is removed, only a 2-D stage (comprised of a feed forward stage and a feedback stage) is removed in order not to affect the remainder of the DFE structure.

In FIG. 10b, the gain terms $C_m{}^b(t)$ and $C_m{}^f(t)$ may be expressed as:

$$C_m{}^f(t) = -\frac{k_m{}^*(t-1)}{r_{m-1}^b(t-2)}$$

and $$C_m{}^b(t) = -\frac{k_m(t-1)}{r_m{}^f(t-1)}$$

while in FIG. 10c, the gain terms $C_m{}^b(t)$ and $C_m{}^f(t)$ may be expressed as:

$C_m{}^f(t) = -k_m{}^H(t-1)[R_{m-1}{}^b(t-2)]^{-1}$ $C_m{}^b(t) = -k_m(t-1)[R_m{}^f(t-1)]^{-1}$.

In addition, in FIG. 10a $$H_M(t) = \frac{-k_M{}^b(t-1)}{r_{M-1}^f(t-1)}$$

and $$g_{M-1}(t) = \frac{-k_M^{x*}(t-1)}{r_{M-1}^b(t-1)}.$$

For $m > N_1 - N_2$, $g_m(t) = -k_m{}^x{}_H(t-1)[R_{m-1}{}^b(t-1)]^{-1}$.

In accordance with an aspect of the invention the number of filter stages to be used is determined by the metrics $J_0, J_1, J_2 \ldots$, which are each formed by metric former 96 in FIG. 10a as a mean square of error differences between consecutive stages:

$J_i = E[e_{i+1}(t^2 - e_i(t)^2]$ $i = 0, 1, \ldots (N_1 - 1)$ (48)

The ensemble average denoted by E{.} may be replaced by a time average:

$$J_i = \frac{1}{N_{slt}} \sum_{j=1}^{N_{slt}} [\bar{e}_{i+1}(j)^2 - \bar{e}_1(j)^2] \quad (49)$$

where $N_{slt}$ denotes the number of data packets over which the time average is taken and $e_i(j)$ denotes the backward prediction error (Equation 46) at stage i averaged over one data packet. Typically, the delay spread changes gradually and its effect is noticeable only over several data packets. As a result, the metrics $J_0$, $J_1$, $J_2$ . . . , are accumulated over several data packets and the following decision rule is employed to make a decision regarding the appropriate number of filter stages (taps):
Number of stages = n − 1 if $$|J_{n-1} - J_n| < \epsilon_{th}$$

with $\epsilon_{th}$ is a predetermined threshold value.

More specifically, the threshold value $\epsilon_{th}$ is set to the value of the mean square error (MSE), approximately $3 \times 10^{-2}$. The mean square error depends on the SNR and, hence, requires the threshold $\epsilon_{th}$ to be adaptive.

The minimum number of data packets over which the metric is accumulated depends on approximating the ensemble average with a time average. For example, a value of 30 data packets may be used.

Stages are bypassed through switch S1 (FIG. 10a) which disconnects the outputs of the unnecessary or unwanted stages to prevent them from contributing to the detection process. The stages are dropped off sequentially from the end rather than in a random manner.

In order to retain a DFE structure at least one feedback stage must be retained, which implies at least one two-dimensional stage. Otherwise, with no two-dimensional stage, the filter (i.e., DFE) would reduce to a scalar lattice filter. Hence, the minimum DFE size requires $N_1 - 2$ scalar stages and 1 two-dimensional stage.

In some instances, such as when the delay spread=0, the DFE will produce a higher bit error rate than if a conventional differential detector were used. In this situation, channel conditions may be monitored such that the DFE may be switched out and the differential detector used in its place.

Figure 10D:
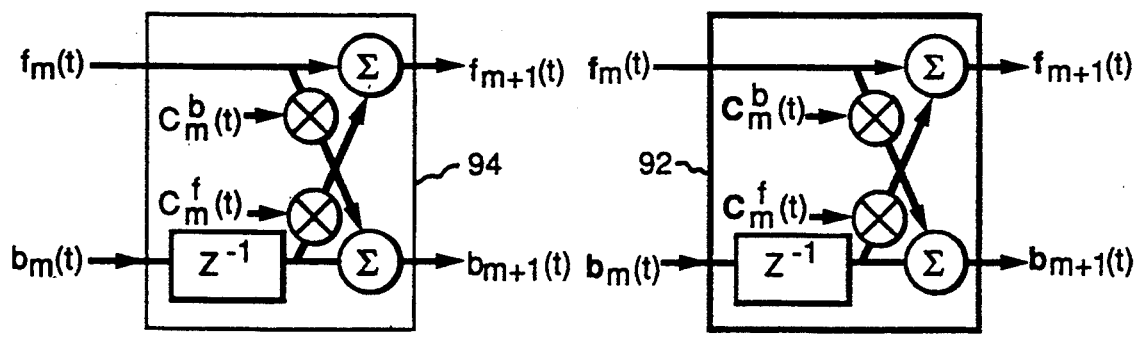
FIG. 10d is a block diagram of metric comparison logic and stage reduction logic that forms a portion of the Order Recursive Lattice DFE.
Figure 10D:
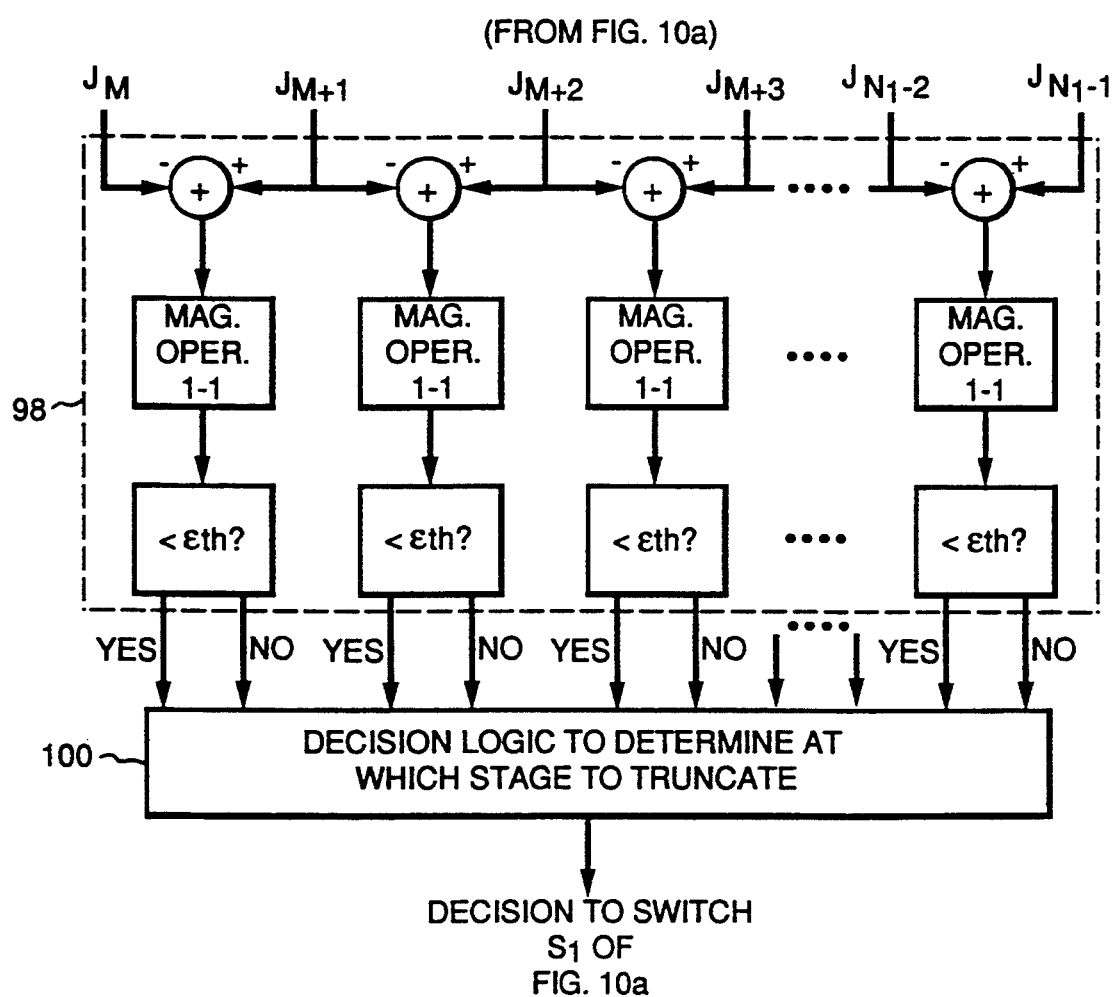

The decision logic block 100 of FIG. 10d that determines the stage therein at which the DFE is truncated may employ several different criteria. The simplest algorithm truncates at stage n−1 if:

$$|J_n - J_{n-1}| < \epsilon_{th}.$$

That is, truncate at the first stage whose differential metric $|J_n - J_{n-1}|$ is determined to be less than the threshold. This comparison function is accomplished by the metric comparison logic 98 of FIG. 10d.

In some instances the metrics will be noisy and unreliable. In this case it may be desirable to "poll" all metric comparisons with a decision logic block 100 before making a truncation decision. The decision as to which stages to remove is made so as to retain as many stages as possible without degrading operation of the L-DFE 90.

As an example, and assuming that $\epsilon_{th} = 4$:

$$|J_{M+1} - J_M| = 4 = \epsilon_{th}$$

$$|J_{M+2} - J_{M+1}| = 2 > \epsilon_{th}$$

$$|J_{M+3} - J_{M+2}| 5 > \epsilon_{th}$$

$$|J_{M+4} - J_{M+3}| 3 > \epsilon_{th}$$

$$|J_{M+5} - J_{M+4}| 2 > \epsilon_{th}$$

$$|J_{M+6} - J_{M+5}| 1 > \epsilon_{th}$$

If the first truncation decision algorithm were employed truncation would occur at stage M+1, corresponding to the comparison $|J_{M+2} - J_{M+1}| = 2$. However, by examining all of the comparisons, stage M+3 should be chosen instead, since a more reliable truncation would result. The decision as to where to truncate preferably is made to retain as many stages as possible to maintain performance. Truncation at stage M+1 would be considered, for this example, as a false alarm condition.

Several variants of the algorithm can be envisaged depending upon the robustness and complexity required. However, by averaging the metrics over 30 data packets (see eqn. 49) a false alarm is rarely observed and the relatively simple scheme given by equation 50 is found to provide adequate performance.

Advantages bestowed upon a digital simulcast system by the teaching of the invention include the following. By incorporating equalizer 24 (FIG. 3) in the mobile simulcast receiver 20, simulcast alignment becomes automatic. This teaching substantially eliminates the time-consuming base station calibrations that are presently required. Another advantage of the invention is that equalizer 24 provides diversity gain. That is, equalizer 24 operates to combine energy from two or more transmissions and thus provides improved bit error rate (BER) performance or provides for a same BER performance but with a lower SNR. This is equivalent to a reduction in transmitted power for achieving a given BER or alternatively increasing the transmission range for a given transmitted power. This in turn allows the simulcasting transmitters to be separated further apart, thereby providing wider area coverage with potentially fewer transmitters. Further, because the equalizers described herein operate to coherently demodulate a received signal, it becomes feasible to employ a transmission phase modulation scheme such as phase shift keying (PSK). The use of PSK provides improved BER performance over presently employed FSK modulation techniques.

While the invention has been particularly shown and described with respect to a preferred embodiment thereof, it will be understood by those skilled in the art that changes in form and details may be made therein without departing from the scope and spirit of the invention.

What is claimed is:

1. Apparatus for simultaneously receiving a plurality of identical RF signals asynchronously from a plurality of transmitter means without mutual interference, each of the RF signals being modulated to convey identical digitally encoded information, comprising:
   receiving means, including a single receiving antenna, for simultaneously receiving the plurality of RF signals from said antenna, said RF signals being Of amplitude dependent upon distance of the receiving means from each of the respective transmitter means; and adaptive equalizer means, having an input coupled to the receiving means, for adaptively equalizing the plurality of received RF signals to correct for a misalignment in time between the received signals, the misalignment in time being due in part to a non-simultaneous transmission of the identical digitally encoded information from each of the plurality of transmitter means.

2. Apparatus as set forth in claim 1 wherein the adaptive equalizer means comprises a Maximum Likelihood Sequence Estimator (MLSE) equalizer means.

3. Apparatus as set forth in claim 1 wherein the adaptive equalizer means comprises a fractionally-spaced Decision Feedback Equalizer (DFE) means.

4. Apparatus as set forth in claim 1 wherein the adaptive equalizer means comprises an Order Recursire Lattice Decision Feedback Equalizer (L-DFE) means.

5. Apparatus as set forth in claim 3 wherein the modulated digitally encoded information is comprised of a plurality of symbols each having a predetermined duration, and wherein the DFE means includes a plurality of taps that are spaced apart from one another by a fraction of the symbol duration.

6. Apparatus for simultaneously receiving a plurality of identical RF signals asynchronously from a plurality of transmitter means without mutual interference, each of the RF signals being modulated to convey identical digitally encoded information in the form of symbols, comprising:

receiving means including a single receiving antenna for simultaneously receiving the plurality of RF signals from said antenna;

adaptive filter means for adaptively filtering the received RF signals to minimize inter-symbol interference due to a misalignment in time between the received RF signals, the adaptive filter means having an input coupled to an output of the receiving means and comprising a decision feedback equalizer having a plurality (n) of feed-forward taps spaced apart from each other by a fraction of a symbol period and a plurality (m) of feedback taps spaced apart from each other by a symbol period, and modifying means for modifying a signal in accordance with an associated coefficient, each of the feed-forward and feedback taps being coupled to an input of said modifying means; and recursive generating means having an input coupled to an output of the adaptive filter means for recursively generating the coefficients in accordance with a Complex Fast-Kalman Algorithm.

7. Apparatus as set forth in claim 6 wherein each of the feed-forward taps is separated from an adjacent feed-forward tap by a duration substantially equal to the duration of one symbol.

8. Apparatus as set forth in claim 6 wherein each of the feed-forward taps is separated from an adjacent feed-forward tap by a duration substantially equal to one half of the duration of one symbol.

9. Apparatus as set forth in claim 6 and further comprising adapting means for initially adapting the adaptive filter means to a sequence of synchronizing symbols.

10. Apparatus as set forth in claim 9 wherein the adapting means includes means for switchably coupling an input of the (m) plurality of feedback taps to a received preamble of known training symbols.

11. Apparatus as set forth in claim 9 wherein the adapting means includes means for switchably coupling an input of the (m) plurality of feedback taps to a received midamble of known training symbols.

12. Apparatus as set forth in claim 6 wherein n =2 and wherein m =3.

13. Apparatus as set forth in claim 6 and further comprising means responsive to a duration of the misalignment being less than a threshold value, for varying the number of taps of the adaptive filter means.

14. Apparatus as set forth in claim 13 wherein the threshold value is a function of the magnitude of misalignment in time between the received RF signals.

15. Apparatus for simultaneously receiving a plurality of identical RF signals asynchronously from a plurality of transmitter means without mutual interference, each of the RF signals being modulated to convey identical digitally encoded information having a preamble portion, a data portion and a midamble portion, comprising:

receiving means for simultaneously receiving at one location the plurality of RF signals over a channel;

first filter means having an input coupled to an output of the receiving means and comprising a fixed transversal filter means having a characteristic selected for matching to a fixed signal pulse characteristic of the received signals for producing; at the output, a filtered second filter means having an input to the output of the first filter means and comprising an adaptive filter means having a characteristic selected for adaptively compensating the filtered signal for a time varying impulse response of the channel, said second filter means including a characteristic selected for adaptively compensating the filtered signal for a misalignment in time between the received RF signals;

means responsive to the filtered signal for initially adapting the second filter means to a synchronizing portion of the filtered signal in accordance with a Recursive Least Squares procedure, and additional means responsive to the filtered signal for subsequently adapting the second filter means to the data portion of the filtered signal in accordance with a Normalized Least Mean Square (NLMS) procedure.

16. Apparatus as set forth in claim 15 wherein the Recursive Least Squares procedure is implemented by a Complex Fast-Kalman algorithm.

17. Apparatus as set forth in claim 15 wherein the second filter means further includes means for processing the filtered signal in accordance with a Viterbi algorithm that employs a modified metric.

18. Apparatus for simultaneously receiving a plurality of identical RF signals asynchronously from a plurality of transmitter means without mutual interference, each of the RF signals being modulated to convey identical digitally encoded information having a preamble portion, a data portion and a midamble portion, comprising:

receiving means for simultaneously receiving at one location the plurality of RF signals over a channel;

first filter means having an input coupled to an output of the receiving means and comprising a fixed transversal filter means having a characteristic selected for matching to a fixed signal pulse characteristic of the received signals for producing, at the output, a filtered signal: and second filter means having an input to the output of the first filter means and comprising an adaptive filter means having a characteristic selected for adaptively compensating the filtered signal for a time varying impulse response of the channel, said second filter means including a characteristic selected for adaptively compensating the filtered signal for a misalignment in time between the received RF signals and means for processing the filtered signal in accordance with a Viterbi algorithm repetitively applied on blocks of 2D symbols, where D represents decision depth for the Viterbi algorithm, such that D symbols are released for adapting the second filter means to the data portion of the filtered signal in accordance with a Normalized Least Mean Square (NLMS) procedure.

19. Apparatus for simultaneously receiving a plurality of identical RF signals asynchronously from a plurality of transmitter means, each of the RF signals being modulated to convey identical digitally encoded information, comprising:

receiving means for simultaneously receiving the plurality of RF signals;

adaptive filter means for adaptively filtering the received RF signals to minimize inter-symbol interference due to an effect of a misalignment in time between the received RF signals, the adaptive filter means having a first input coupled to an output of the receiving means and comprising multi-stage lattice decision feedback equalizer means having (M =N1-N2) scalar taps followed by (N2-1) two-dimensional taps and metric forming means for forming a metric in accordance with a predetermined mathematical relationship between the tap output and another tap output, including accumulating means for accumulating a plurality of the formed metrics over a plurality of data packets, each of the taps being coupled to an input of said forming means; and recursive determining means having an input coupled to outputs of the accumulating means for recursively determining a number of taps for the lattice decision feedback equalizer means for use during a next data packet, the recursive determining means including means for comparing a difference between two accumulating means output signals to a threshold value.

20. Apparatus as set forth in claim 29 wherein the metric forming means includes means for forming the metric in accordance with the squared of the difference between the tap output and the tap output of a consecutive stage.

21. Apparatus as set forth in claim 19 wherein the threshold value is a function of misalignment magnitude in time, between the received RF signals.

22. Apparatus as set forth in claim 19 and further comprising additional means for providing the adaptive filter means, at the beginning of a data packet, with a sequence of synchronizing symbols for training the adaptive filter means.

23. Apparatus as set forth in claim 22 wherein the additional means also provides the adaptive filter means, at a time subsequent to the beginning of a data packet, with another sequence of known symbols for retraining the adaptive filter means.

24. A method for simultaneously receiving a plurality of identical RF signals asynchronously from a plurality of transmitter means without mutual interference, each of the RF signals being modulated to convey identical digitally encoded information, comprising the steps of:

simultaneously receiving the plurality of RF signals at a receiving meads including a single antenna, said RF signals being of amplitude dependent upon distance of the receiving means from each of the respective transmitter means; and adaptively equalizing the plurality of received RF signals to correct for a misalignment in time between the received signals, the misalignment in time being due in part to a non-simultaneous transmission of the identical digitally encoded information from the plurality of transmitter means.

25. A method as set forth in claim 24 wherein the step of adaptively equalizing includes operating a Maximum Likelihood Sequence Estimator (MLSE) equalizer means.

26. A method as set forth in claim 24 wherein the step of adaptively equalizing includes operating an Order Recursire Lattice Decision Feedback Equalizer (L-DFE) means.

27. A method as set forth in claim 24 wherein the step of adaptively equalizing includes operating a fractionally-spaced Decision Feedback Equalizer (DFE) means.

28. A method for simultaneously receiving a plurality of identical RF signals asynchronously from a plurality of transmitter means without mutual interference, each of the RF signals being modulated to convey identical digitally encoded information, comprising the steps of:

simultaneously receiving the plurality of RF signals at a single antenna;

adaptively filtering the received RF signals to minimize inter-symbol interference due to a misalignment in time between the received RF signals, the step of adaptively filtering including operating a decision feedback equalizer means having a plurality (n) of feed-forward taps spaced apart from each other by a fraction of a symbol period and a plurality (m) of feedback taps spaced apart from each other by a symbol period and modifying the output signal from said taps in accordance with an associated coefficient for each of said taps, respectively; and recursively generating the coefficients in accordance with a Complex Fast-Kalman Algorithm.

29. A method as set forth in claim 28 and further comprising an initial step of adapting adaptive filter means to a sequence of synchronizing symbols.

30. A method as set forth in claim 29 wherein the step of adapting further includes a step of switchably coupling an input of the (m) plurality of feedback taps to a received preamble of known training symbols.

31. A method as set forth in claim 29 wherein the step of adapting further includes a step of switchably coupling an input of the (m) plurality of feedback taps to a received midamble of known training symbols.

32. A method as set forth in claim 28 and further comprising a step, performed in response to a duration of the misalignment being less than a threshold value, of varying the number of taps of the adaptive filter means.

33. In a receiver for receiving a digital simulcast transmission, a method for demodulating a received RF signal having a plurality of symbols comprising at least a synchronizing portion and a data portion of a data packet, comprising the steps of:

(a) receiving the RF signal over a channel;
(b) determining a channel impulse response of the received signal over the synchronizing portion;
(c) employing a normalized least mean square algorithm for adapting the channel impulse response;

(d) operating a maximum likelihood sequence estimator over 2D symbols, D being decision depth delay;

(e) releasing D symbols;

(f) employing the D released symbols to update the channel impulse response; and (g) beginning with a Dth symbol repeating steps (d), (e) and (f) until a penultimate data block having 2D symbols is received;

(h) or, when 2D is not an integral multiple of a number of symbols $N_{sym}$, appending $\{N_{sym} - \lfloor N_{sym}/2D \rfloor 2D\}$ symbols to a last block of 2D symbols.

34. In a receiver for receiving a digital simulcast transmission, said receiver including an adaptive filter matched to estimated channel characteristics, channel adaptation means coupled to said adaptive filter, a modified Viterbi algorithm generator responsive to said adaptive filter, and signal reconstruction means responsive to said channel adaptation means and said modified Viterbi algorithm generator, a method for determining a value for signal elements, represented by $\{s(1)\}$, from an estimated channel impulse response, represented by $\tilde{h}(n) = \tilde{h}_n(1)\tilde{h}_n(2) \ldots \tilde{h}_n(N)$, comprising the steps of:

(a) determining in said channel adaptation means a value of a first factor $\sigma(n) = \gamma\sigma(n-1) + 1$, with an initial value of $\sigma(0) = 0$ and $\gamma$ chosen to be a value between 0.9–0.95;

(b) determining in said channel adaptation means a vector of smoothed channel impulse response in coefficients in accordance with the expression $$\tilde{h}_s(n) = \tilde{h}_s(n-1) + \frac{1}{\sigma(n)}(\tilde{h}(n) - \tilde{h}_s(n)),$$

where $\tilde{h}_s(n)$ is the vector of smoothed channel impulse response coefficients denoted by $\tilde{h}_{sn}(1)\tilde{h}_{sn}(2) \ldots \tilde{h}_{sn}(N)$, the subscript sn denoting a smoothed estimate at time n; and (c) determining in said signal reconstruction means a value for the signal elements in accordance with the expression:

$$s(l) = s^*(-l) = \sum_{k=1}^{N} \tilde{h}_{sn}(k)\tilde{h}_{sn}(k+1)$$

where $l = -1, 0, 1$.

35. A method as set forth in claim 34 wherein a value of s(0) is kept fixed, and wherein s(1) and s(-1) are updated with time in accordance with the expression of step (c).

36. A method as set forth in claim 35 wherein for an $n^{th}$ instant s(1) and s(-1) are computed in accordance with the expressions:

$$s(1) = \tilde{h}_{sn}(1)\tilde{h}_{sn}(2); \text{ and}$$

$$s(-1) = s^*(1).$$

* * * * *